(12) United States Patent
Urey et al.

(10) Patent No.: US 11,294,182 B2
(45) Date of Patent: Apr. 5, 2022

(54) NEAR-TO-EYE DISPLAY DEVICE USING A SPATIAL LIGHT MODULATOR

(71) Applicant: CY VISION INC., San Jose, CA (US)

(72) Inventors: Hakan Urey, Sariyer/Istanbul (TR); Erdem Ulusoy, Sariyer/Istanbul (TR); Mehmet Kivanc Hedili, Sariyer/Istanbul (TR)

(73) Assignee: CY VISION INC., San Jose, CA (US)

( * ) Notice: Subject to any disclaimer, the term of this patent is extended or adjusted under 35 U.S.C. 154(b) by 413 days.

(21) Appl. No.: 16/485,726

(22) PCT Filed: Feb. 28, 2017

(86) PCT No.: PCT/TR2017/050078
§ 371 (c)(1),
(2) Date: Aug. 13, 2019

(87) PCT Pub. No.: WO2018/160146
PCT Pub. Date: Sep. 7, 2018

(65) Prior Publication Data
US 2020/0049995 A1 Feb. 13, 2020

(51) Int. Cl.
G02B 27/01 (2006.01)
G06F 1/16 (2006.01)

(52) U.S. Cl.
CPC ..... *G02B 27/0172* (2013.01); *G02B 27/0179* (2013.01); *G06F 1/163* (2013.01); *G02B 2027/0174* (2013.01); *G02B 2027/0187* (2013.01)

(58) Field of Classification Search
CPC ............ G02B 27/0172; G02B 27/0179; G02B 2027/0174; G02B 2027/0187; G02B 27/0103; G02B 2027/0181; G02B 2027/0183; G06F 1/163
USPC ........................................................... 359/13
See application file for complete search history.

(56) References Cited

U.S. PATENT DOCUMENTS

| 5,715,337 A | * | 2/1998 | Spitzer | G02B 27/017 359/223.1 |
| 6,160,667 A | * | 12/2000 | Smoot | G02B 27/0172 345/7 |
| 2015/0036221 A1 | * | 2/2015 | Stephenson | G02B 27/0101 359/630 |
| 2015/0346495 A1 | * | 12/2015 | Welch | G06F 1/163 345/8 |

(Continued)

FOREIGN PATENT DOCUMENTS

WO 2016/105285 A1 6/2016

OTHER PUBLICATIONS

International Search Report from Int. Appl. No. PCT/TR2017/050078, dated Nov. 21, 2017.

*Primary Examiner* — Thomas K Pham
*Assistant Examiner* — Henry A Duong
(74) *Attorney, Agent, or Firm* — Nevrivy Patent Law Group P.L.L.C.

(57) ABSTRACT

The present invention relates to a near-to-eye display device display device in the form of a head-worn display. The present invention more particularly relates to a near-to-eye display device (10) comprising at least one point light source (11), at least one spatial light modulator (18) and at least one reflector mounted on the near-to-eye display device (10).

41 Claims, 25 Drawing Sheets

(56) References Cited

U.S. PATENT DOCUMENTS

2016/0033771 A1* 2/2016 Tremblay ............... G02B 26/10
345/8
2018/0364643 A1* 12/2018 Kroll .................... G03H 1/0808

* cited by examiner

NEAR-TO-EYE DISPLAY DEVICE USING A SPATIAL LIGHT MODULATOR

TECHNICAL FIELD OF THE PRESENT INVENTION

The present invention relates to a near-to-eye display device in the form of a head-worn display device.

BACKGROUND OF THE PRESENT INVENTION

Head-worn displays (HWD) typically employ a micro-display on which a two dimensional (2D) regular image is displayed. Since the physical distance between the micro-display and the eye is typically much smaller than 25 cm (the closest distance at which the human eye can normally focus), a blurred image forms on the retina unless relay optics are placed in between. The relay optics typically consist of several lenses which serve to form a magnified virtual image of the micro-display beyond 25 cm (mostly at infinity) on which the eye can then focus and form a sharp retinal image.

Lightweight HWD designs that employ micro-displays (those that use only a single magnifier lens, for instance) are mostly restricted to systems having small fields of view (FOV), since weight and bulk increase for large FOV designs due to additional components inserted to compensate for aberrations. On the other hand, high end military-type displays may support a FOV approaching 150 degrees or more, but can weigh more than 1 kg and may contain more than 10 different lenses, most of which are present to compensate for aberrations that emerge due to the enlarged FOV. Having so many lenses is not merely a technological problem, but a fundamental one, since no single optical component can be designed to form an aberration free image of a large size micro-display, due to the fact that the information emerging from the micro-display quickly gets spread in space as it propagates.

On the other hand, a holographic HWD has many advantages over conventional micro-display based displays. Most importantly, with a holographic HWD it is possible to achieve wide field of view (FOV), retinal resolution, distortion and aberration-free 3D images, natural depth cues, and an eyeglass form factor, which are impossible to achieve simultaneously with any other conventional HWD design approach.

If there existed a large size (about 5 cm by 4 cm) spatial light modulator (SLM) with sub-micron full-complex pixels, a holographic HWD could readily deliver a wide FOV (about 100-110 degrees) image at retinal resolution within a large sized viewing box (10-15 mm). Such a system would automatically handle the pupil movements of a user. However, such an SLM does not exist today. At a certain instant, currently existing SLMs can provide a high resolution image only within a 10-20 degree FOV and for a viewing box of 4-5 mm.

"Spatial light modulator" (SLM) generally refers to devices that can be dynamically programmed to implement 2D complex multiplicative optical transparencies that are functions of two spatial coordinates and time. In holographic display applications, SLMs are mainly deployed to display computer generated holograms (CGHs). Commonly existing SLMs are based on liquid crystal technology, liquid crystal on silicon technology, MEMS based digital micro mirror array technology, etc. LCD SLMs are transmissive, while LCoS SLMs are reflective. Although SLMs are ideally expected to provide full-complex modulation, practical SLMs provide only some restricted type of modulation such as phase-only, amplitude-only, binary etc. A multitude of algorithms such as iterative Fourier algorithm, Gerschberg-Saxton algorithm, error diffusion etc. have been designed so that the desired full-complex hologram is encoded into a restricted form hologram. These procedures mostly result in the emergence of noise along with signal beams. Another practical problem with SLMs is that most SLMs do not have 100% modulation efficiency, that is, only a fraction of the incident light gets modulated by the SLM and the rest of the light remains unmodulated. Almost all SLMs are pixelated devices, resulting in the generation of higher diffraction order replicas of signal, noise and unmodulated beams. In holographic HWD designs, only the main signal beam should enter the eye and reach the retina, while noise beams, unmodulated beams, as well as higher diffraction order replicas should be blocked. This requirement necessitates additional precautions to be taken.

It is well known that a "point light source" is a theoretical concept, describing a light source which has perfect spatial coherence. In a holographic display application, such a source should also be monochromatic, i.e. generate merely a single wavelength. In a practical setting, a "point light source" should be understood as a source with a high degree of spatial coherence (i.e. sufficiently small emission area) along with a high degree of temporal coherence (i.e. narrowband source). In color display applications, either three such sources are needed, one for each color component, or the point light source should be able to provide three wavelengths, perhaps in a time sequential fashion. Single mode fiber coupled RGB laser diodes, or narrowband, small emission area LEDs are common means of implementing such sources. The present invention requires at least one point light source. However, in order to improve performance, and facilitate system operation, an array of point light source where only one source is active at a time may be preferred in several embodiments.

One of the prior art documents in the technical field of the present invention can be referred to as U.S. Pat. No. 5,715,337, disclosing a compact display system including a viewing surface; a beam steering mechanism; a source of light remote from the viewing surface and the beam steering mechanism; and at least one waveguide connecting the source of light with the viewing surface for transmitting illumination from the source of light to the viewing surface. The beam steering mechanism is associated with the waveguide and the viewing surface for scanning illumination transmitted by the waveguide onto the viewing surface. There is a modulator for modulating the source of light; and a subsystem for synchronizing the modulator with the beam steering mechanism, but only the distal end of the waveguide and the beam steering mechanism are located near the viewing surface resulting in a more compact display which can be mounted on a pair of eyeglasses. U.S. Pat. No. 5,715,337 provides that only the distal end of the waveguide and the beam steering mechanism are located near the viewing surface resulting in a more compact display which can be mounted on a pair of eyeglasses.

The present invention, on the other hand, provides a near-to-eye display device comprising a plurality of point light sources and at least one micro-display device in the form of a spatial light modulator positioned to be illuminated by at least one point light source, said at least one micro-display device transmitting the light coming from the light source to an optionally curved reflector.

The present invention exploits the fact that the visual acuity of human eye is not uniform across the visible FOV, but instead highest in the direction of line of sight (the direction of the arrow pointed from the rotation center of the eye to the center of eye pupil) and decreases gradually thereof. Usually, part of the FOV that lies in the vicinity of about 10 degrees around the line of sight is associated with central vision, and the rest of the FOV is associated with peripheral vision. Common display devices such as LCD televisions and monitors, or smart phone screens etc. do not exploit this property of the human eye but provide a uniform resolution throughout the entire FOV. The display device disclosed here distinguishes between central vision and peripheral vision, and delivers images with varying resolution so that its implementation with existing SLM devices becomes feasible, or easier.

At each instant of operation, the disclosed display device delivers a wide FOV image to the user's eye. Part of the image that forms the central vision is delivered by an SLM and is holographic, providing natural depth cues. Part of the image that forms the peripheral vision is delivered by a regular display and is low-resolution and blurred.

Displays that provide a high resolution central vision and a low resolution peripheral vision are usually referred to as foveated displays in the literature. The present invention preferably is a foveated HWD.

A challenging problem in the design of foveated HWDs is the handling of eye pupil movements. As humans steer their pupil (rotate their eye balls), the part of the FOV that they view in high visual acuity changes. Therefore, a foveated HWD should be able to steer the high quality central vision image within the entire FOV along with the eye pupil. This task is in general not easy. As an example, one can suppose that an SLM that can provide about 10 degrees of instantaneous FOV is placed inside a hole carved out of a low resolution LCD, and the combined structure (LCD and SLM) is placed directly in front of the eye, a few centimeters away. Such a display provides a high resolution holographic central vision image, and a low resolution defocused peripheral image. However, the user can see the holographic image at high visual acuity only if he looks towards the SLM. If he looks towards a point on the LCD, she/he does not see a high quality image in his central vision, she/he cannot perceive the holographic image provided by the SLM in high quality since the SLM now falls in peripheral part of FOV. Thus, in order to handle eye pupil movements (or eye ball rotations) the combined structure (SLM and LCD) must be translated and/or rotated along with the eye pupil, which is highly impractical.

Therefore, foveated holographic HWD designs in general require mechanical movement of system components. However, in the disclosed invention, such mechanical motion of the SLM is not necessary at all. The present invention achieves this advantage by its eye centric design. The components of the system include at least one point light source at least one SLM, at least one imaging lens.

OBJECTS OF THE PRESENT INVENTION

Primary object of the present invention is to provide a near-to-eye display device in the form of a head mountable display device.

Another object of the present invention is to provide a near-to-eye display device having a spatial light modulator (SLM) that is located at a focal point of a curved reflector.

Still further an object of the present invention is to locate the center of a user's eye at a focal point of a curved reflector in a stationary position SLM configuration.

BRIEF DESCRIPTION OF THE FIGURES OF THE PRESENT INVENTION

Accompanying drawings are given solely for the purpose of exemplifying a near-to-eye display device in the form of a head-worn display, whose advantages over prior art were outlined above and will be explained in brief hereinafter.

The drawings are not meant to delimit the scope of protection as identified in the claims nor should they be referred to alone in an effort to interpret the scope identified in said claims without recourse to the technical disclosure in the description of the present invention.

The drawings are only exemplary in the sense that they do not necessarily reflect the actual dimensions and relative proportions of the respective components of any system or sub-system.

FIG. 1 demonstrates a general schematic view of a near-to-eye display device consisting of a light source, a spatial light modulator and an imaging lens according to the present invention.

FIG. 2 demonstrates a general schematic view of a near-to-eye display device highlighting basic operational principles of the eye-centric foveated holographic HWD in the context of an exemplary design according to the present invention.

FIG. 3 demonstrates a general schematic view of a near-to-eye display device with an eye tracker and a computer according to the present invention.

FIG. 4 demonstrates a general schematic view of a near-to-eye display device with two-eye operation according to the present invention.

FIG. 5 demonstrates a general schematic view of a near-to-eye display device with the eye looking straight ahead according to the present invention.

FIG. 6 demonstrates a general schematic view of a near-to-eye display device when the eye is in rotational movement.

FIG. 7 demonstrates a hologram computation process for delivering a central vision image according to the present invention.

FIG. 8 demonstrates an on-axis optical architecture of a near-to-eye display device according to the present invention.

FIG. 9 demonstrates a general schematic view of a near-to-eye display device with a pixelated SLM according to the present invention.

FIG. 10 demonstrates a field distribution on the exit pupil plane according to the present invention.

FIG. 11 demonstrates a general schematic view of a near-to-eye display device operating for a rotated eye pupil position according to the present invention.

FIG. 12 demonstrates a general schematic view of a near-to-eye display configuration with virtual objects displayed for an on-axis pupil configuration according to the present invention.

FIG. 13 demonstrates the reconstruction of a virtual object point for an off-axis eye pupil position according to the present invention.

FIG. 14 demonstrates a general schematic view of a near-to-eye display device where a second spatial filter is used in the system so that undesired beams are filtered out before they reach the pupil plane according to the present invention.

FIG. 15 demonstrates a general schematic view of a near-to-eye display where an active optical spatial filter is reconfigured so as to be adapted for off-axis pupil position according to the present invention.

FIG. 16 demonstrates that illumination wave of the SLM can be a diverging wave as well as collimated or converging waves.

FIG. 17 demonstrates an alternative architecture of a near-to-eye display device in which the SLM is first transformed by a demagnifier into a transformed SLM according to the present invention.

FIG. 18 demonstrates an alternative architecture of a near-to-eye display device where a demagnifier is implemented by a positive lens according to the present invention.

FIG. 19 demonstrates a general schematic view of a near-to-eye display device where the system is made see through by a beam-splitter placed between the eyepiece lens and eye according to the present invention.

FIG. 20 demonstrates a general schematic view of a near-to-eye display device where an eyepiece lens is replaced by a reflector in the form of ellipsoid according to the present invention.

FIG. 21 demonstrates a general schematic view of a near-to-eye display device where an eyepiece lens is replaced by a reflector in the form of an elliptical mirror and the demagnifier is realized by a convex mirror according to the present invention.

FIG. 22 demonstrates a general schematic view of a near-to-eye display device where an eyepiece lens is replaced by a reflector in the form of an elliptical mirror and the demagnifier is realized by a concave mirror according to the present invention.

FIG. 23 demonstrates a general schematic view of a near-to-eye display device where the SLM is reflective rather than transmissive according to the present invention.

FIG. 24 demonstrates a general schematic view of a near-to-eye display device where a rotatable prismatic optical element is placed in front of a stationary light source.

FIG. 25 demonstrates a general schematic view of a near-to-eye display device where the point light source is implemented with a fiber coupled light source.

DETAILED DESCRIPTION OF THE PRESENT INVENTION

The following numerals are used to refer to various parts and definitions in the detailed description of the present invention:

10) Near-to-eye display device
11) Light source
12) Curved reflector
13) First focal point
14) Second focal point
15) Eye
16) Illumination lens
17) Eye rotation center
18) Spatial light modulator
19) Eye pupil
20) Imaging lens
21) Spatial light modulator image
22) SLM image plane
23) Pupil tracker
24) Computer
25) Light source array
26) Viewing box
27) Exit pupil plane
28) Central vision
29) Peripheral vision
30) Display
31) High resolution central FOV
32) High resolution extended FOV
33) Low resolution peripheral FOV
34) Virtual object
35) Intermediate image
36) Eyepiece lens
37) Unmodulated beam
38) Undesired diffraction orders
39) Viewing box diffraction orders
40) Noise beam
41) Optical spatial filter
42) Demagnifier
43) Transformed SLM
44) Beam-splitter
45) Prismatic optical element
46) Fiber coupled light source In general, systems that display a virtual scene and block the real world view are referred to as "virtual reality" (VR) systems, whereas systems that overlay virtual objects onto real world objects are referred to as "augmented reality" (AR) systems. The present invention discloses a near-to-eye display device (10) which can be designed/customized to operate in both VR and AR modes. The essential components of the display include a light source (11), a spatial light modulator (18) and imaging lens (20) as will be delineated hereinafter.

Said spatial light modulator (18) spatially modulates the phase and/or amplitude of the incident wave derived from the said light source (11) and is imaged by an imaging lens (20) to a spatial light modulator image plane (22) and a spatial light modulator image (21) is formed, as it can be seen from FIG. 1.

In preferred embodiments, near-to-eye display device (10) is a monochrome display device, and light source (11) only generates a coherent light wave of a single color. In other embodiments, near-to-eye display device (10) is a full color display device, and light source (11) generates coherent light waves of different wavelengths in a time sequential manner. Between the imaging lens (20) and spatial light modulator image plane (22), the system forms a viewing box (26) at the exit pupil plane (27). During operation, the eye (15) of the user is located such that the eye rotation center (17) substantially overlaps with the center of the spatial light modulator image (21), and the viewing box (26) formed by the system substantially overlaps with the eye pupil (19) of the user.

In the absence of the eye (15), all the rays modulated by the spatial light modulator (18) and captured by the imaging lens (20) contribute to the spatial light modulator image (21). It is to be noted that part of these rays pass through the viewing box (26) while the rest pass through the parts of the exit pupil plane (27) outside the viewing box (26). When the eye (15) is placed as in FIG. 1 with the eye pupil (19) conjugated to the viewing box (26), only part of the rays falling inside the viewing box (26) pass through the eye pupil (19) and contribute to the spatial light modulator image (21), while the rest of the rays get blocked at the exit pupil plane (27) and do not contribute to the spatial light modular image (21). Therefore, eye pupil (19) acts as a spatial filter.

The computer generated hologram (CGH) on the spatial light modulator (18) is computed such that rays falling inside the viewing box (26) are equivalent to rays that would emerge from some virtual objects that are intended to be displayed to the user; all undesired beams generated by the spatial light modulator (18) fall outside the viewing box (26) and get filtered out by the eye pupil (19) or get blocked by other components in the optical train from the light source (11) to the exit pupil plane (27).

Since the spatial light modulator image (21) is conjugated to the eye rotation center (17), regardless of the position of eye pupil (19), there exists a ray that emerges from the center of the spatial light modulator (18), passes through the center of the viewing box (26) (which is aligned with the position of the eye pupil (19) by the CGH displayed on the spatial light modulator (18)), passes through the center of the eye pupil (19), passes through the center of the spatial light modulator image (21), and lands on the center of fovea on the retina. Therefore, without any change in the optical architecture (i.e. no mechanical movement), a high resolution central vision can be delivered by the display.

In FIG. 2, an embodiment is illustrated where the imaging lens (20) is implemented by a curved reflector (12), which may be part of an ellipsoid or a paraboloid that is placed in front of the eye (15) such that the eye rotation center (17) is placed at one focal point of the curved reflector (12). At the other focal point of the curved reflector (12), the spatial light modulator (18) is placed. In this way, a spatial light modulator image (21) is formed at the eye rotation center (17) by the curved reflector (12). As a result, the user will see the spatial light modulator (18) in his central FOV as long as he looks towards a point on the curved reflector (12) (for each point on the curved reflector (12) that the eye (15) is directed towards, it is possible to find a ray that starts from the center of the spatial light modulator (18), hits that point on the curved reflector (12), gets reflected and passes through the center of eye pupil (19) and eye rotation center (17) and lands on the center of fovea on the retina). Hence, for each position of the eye pupil (19), the spatial light modulator (18) is able to deliver a high resolution holographic image that would form the central vision, without the need for any mechanical motion.

A specific light source (11) generates a coherent light wave of a single wavelength that illuminates the spatial light modulator (18) that is located on a first focal point (13) or a second focal point (14) of the curved reflector (12). As it can be seen from FIG. 3, the optical architecture consists of the spatial light modulator (18), the curved reflector (12), placed such that the spatial light modulator image (21) is formed at the eye rotation center (17).

This part of the system forms a central vision (28) for the current location of the eye pupil (19). The display (30) at the background forms the peripheral vision (29). Part of the display (30) overlapping with central vision (28) is darkened so that in this portion of the field of view, the user receives merely the light modulated by the spatial light modulator (18) and central vision (28) is formed holographically. The pupil tracker (23) is conventionally effective in tracking movements of the user eye (15) and computer (24) effectuates control of the light source array (25). When the user moves their eye during viewing of the visual content, pupil tracker (23) sends a corresponding signal to said computer (24) to operate the light source array (25) in the manner that a respective light source (11) is turned off and another one is turned on. The pupil tracker (23) may conventionally include one or more cameras, light sources (e.g., infrared), and a processing element to interpret the eye tracking data and to control computer (24).

The present invention proposes a light source array (25) which is located behind the spatial light modulator (18) comprising a plurality of and preferably at least three light sources (11). The light source array (25) is used to illuminate the spatial light modulator (18). At each time instant, at least one light source (11) of the light source array (25) is active. An illumination lens (16) may be placed between the light source array (25) and spatial light modulator (18) to provide a collimated plane wave or converging illumination to the spatial light modulator (18). Typical spatial light modulators (18) modulate only part of the incident light, while a portion of incident light remains unmodulated.

The light source (11) of the light source array (25) is chosen such that unmodulated beams are filtered out by the eye pupil (19) to the best extent and perceived brightness is highest. In case spatial light modulator (18) pixels have wide diffraction cones and the spatial light modulator (18) has very high (close to 100%) diffraction efficiency, optionally only one active light source (11) is employed and the light source array (25) is optionally discarded.

During operation, a pupil tracker (23) attached to the display unit dynamically tracks the location of the eye pupil (19) of the user and sends the data to the computer (24). In accordance with the detected eye pupil (19) position, the computer (24) sends signals to (i) light source array (25), such that the correct light source (11) is selected, (ii) spatial light modulator (18), so that the correct content is uploaded and desired central vision (28) image is delivered and (iii) display (30), so that the correct content is uploaded and desired peripheral vision (29) image is delivered.

The inset in FIG. 3 shows the form of the retinal images delivered by the system to the user. The entire field of view (FOV) delivered is shown by the outer rectangular box. At a certain instant, the inner circle shows the high resolution central FOV (31) that forms the central vision (28). The remaining area corresponds to peripheral vision (29). As the user rotates his eye (15), different regions of the entire FOV are viewed in high resolution. The inner rectangular box shows the part of FOV in which the high resolution central FOV (31) can be steered, and is named the high resolution extended FOV (32). Part of the entire FOV is always delivered in low resolution, and hence named the low resolution peripheral FOV (33). The extent of the high resolution extended FOV (32) is determined by the aperture size of the curved reflector (12).

FIG. 4 illustrates an exemplary full two-eye version of a preferred embodiment. Transparent curved reflectors (12) and spatial light modulators (18) are responsible from the formation of steerable high resolution holographic central vision images by forming spatial light modulator images (21) at the eye rotation center (17). The display (30) forms a blurred, low resolution peripheral image. If the display (30) is also transparent, than the system becomes an augmented reality display. If a virtual reality mode of operation is desired, relay lenses may be inserted between display (30) and reflectors (12) so that peripheral vision image may be focused as well.

FIG. 5 illustrates the situation when the eye (15) is looking straight ahead; the spatial light modulator (18) and the curved reflector (12) deliver a holographic image that occupies the central part of the FOV, forming central vision (28) during the operation. The corresponding part of the display (30) is darkened. The image on the remaining sections of the display (30) forms a low-resolution peripheral vision (29).

When the eye (15) rotates as it can be seen in FIG. 6, the content on the spatial light modulator (18) is updated so that central vision (28), which now corresponds to an oblique portion of the total FOV, is delivered in high quality. Meanwhile, the image on the display (30) is updated. The darkened part of the display (30) is aligned with central vision, and the remaining part forms peripheral vision (29).

FIG. 7 illustrates the hologram computation process for delivering the central vision image. Both figures assume that the eye pupil (19) position is on-axis, i.e. the user is looking straight ahead (upwards). Left figure illustrates the process for an on-axis point of a virtual object (34), while the right figure illustrates the process for an off-axis point of a virtual object (34).

For a virtual object (34) appearing in the instantaneous central vision FOV, rays are firstly traced from the virtual object (34) to the eye pupil (19) (bypassing the curved reflector (12)). Then, the rays are traced backwards from the eye pupil (19) to the curved reflector (12), and then to the spatial light modulator (18) surface. The rays hitting the spatial light modulator (18) surface constitute the rays that need to be generated by the CGH displayed on the spatial light modulator (18). The CGH for each virtual object point thus turns out to be a lens term that transforms the illumination rays to the rays that need to be emerging from the spatial light modulator (18) surface. The total CGH is obtained by superposing the lens terms for each virtual object point lying in the instantaneous central vision FOV.

Also seen in FIG. 7 is the formation of an intermediate image (35) between the curved reflector (12) and the spatial light modulator (18). That is, the spatial light modulator (18) first forms a real intermediate image (35) that corresponds to a distorted and demagnified version of the desired 3D virtual object (34), between the spatial light modulator (18) and the curved reflector (12). The curved reflector (12) then serves as an off-axis eyepiece lens (36) and forms a magnified and distortion corrected virtual image from the real intermediate image, which is ultimately relayed to the eye.

FIG. 8 depicts the fundamental on-axis optical architecture according to an embodiment of the presented invention. From left to right, the optical system consists of a light source array (25) where at least one light source (11) is activated at a single time, illumination lens (16), the spatial light modulator (18), the eyepiece lens (36), the eye pupil (19) and the eye (15) of the user.

The eyepiece lens (36), serving as the imaging lens (20), forms a spatial light modulator image (21) at the eye rotation center (17). As a result, at every position of the eye pupil (19), the spatial light modulator (18) remains visible to the eye (as long as the user is looking towards a point on the eyepiece lens (36)). In other words, the spatial light modulator (18) can deliver a foveated high resolution central vision image without any change in the optical architecture, i.e. no mechanical movement.

The illumination optics consists of a light source array (25) and an illumination lens (16). At a given time, at least one light source (11) will be active. In a preferred embodiment of the invention, a collimated illumination wave derived from the light source (11) via the illumination lens (16) hits the spatial light modulator (18). In general, part of the illumination wave forms the signal wave that generates the target 3D image in user's retina, while part of the illumination wave may remain unmodulated, named the unmodulated beam (37). The unmodulated beam (37) remains collimated after passing the spatial light modulator (18). In a preferred embodiment, the unmodulated beam (37) gets focused on the pupil plane at a point outside the eye pupil (19), hence gets filtered and does not reach the user's retina.

FIG. 9 illustrates that, the eyepiece lens (36) images the spatial light modulator (18) and forms the spatial light modulator image (21). In the absence of the eye (15), all the rays emerging from the spatial light modulator (18) and captured by the aperture of the eyepiece lens (36) contribute to the formation of the spatial light modulator image (21). The rays emerging from the spatial light modulator in general are associated with the signal beam designed to form a viewing box (26) on the eye pupil plane and display a desired 3D virtual object or scene, unmodulated beam (37) due to the fact that spatial light modulator (18) modulation efficiency is less than 100%, and noise (and conjugate) beams due to possible spatial light modulator (18) restrictions such as being phase or amplitude only. Assuming that the spatial light modulator (18) is pixelated, all the mentioned beams actually have higher diffraction order replicas as well.

Therefore, in the absence of the user's eye (15), rays associated with all these beams (more precisely, only those captured by the eyepiece lens (36) aperture), all contribute to the spatial light modulator image (21). However, when the user's eye (15) is placed such that the eye rotation center (17) becomes coincident with the spatial light modulator image (21), the eye pupil (19) of the user acts as a spatial filter that selects some of the rays emerging from the spatial light modulator (18) to contribute to the spatial light modulator image (21), while blocking the rest of the rays before they contribute to the spatial light modulator image (21) and land on the retina.

Ideally, the ray distribution on the eye pupil (19) plane should be such that for a given eye pupil (19) position, only the rays associated with signal beams must enter the eye (15) and contribute to the spatial light modulator image (21) and thus to the final retinal image, whereas the rays associated with all other beams such as noise beams and higher diffraction orders, unmodulated beams and higher diffraction orders, and the higher diffraction orders of signal beams should be filtered out. In this respect, the optical design must satisfy certain constraints; the CGH displayed on the spatial light modulator (18) should be computed such that the viewing box (26) formed at the eye pupil (19) plane is conjugated with the eye pupil (19) of the user, whose location is measured by the pupil tracker (23).

FIG. 9 illustrates the case of a proper design, where the unmodulated beam (37) and its nearest higher diffraction order replica (one of the undesired diffraction orders (38)) both fall outside the eye pupil (19), and provide a clear region in between where viewing box (26) can be placed inside which the signal wave can be formed. When the eye pupil (19) is placed in this region (the viewing box (26)) only the desired wave enters the eye (15), and undesired beams are filtered out.

For the system to function (i.e. provide a clear retinal image), the higher diffraction order replicas of the actual spatial light modulator (18) need to be separated by more than the eye pupil (19) size on the pupil plane. Therefore, a certain demagnification is preferably provided by the eyepiece lens (30). Another way to interpret this result is to recognize that the spatial light modulator image (21) may be viewed as a new spatial light modulator created by the system. This new spatial light modulator (18) should have sufficiently small pixels so that when it is placed at the eye rotation center (17), the higher diffraction order replicas are separated wide enough so that they can be spatially filtered by the eye pupil (19).

The demagnification provided by the eyepiece lens (36) depends on the ratio of the distance between eyepiece lens (36) and eye rotation center (17) to the distance between spatial light modulator (18) and eyepiece lens (36). Thus, for a given eye clearance distance and spatial light modulator

(18) pixel pitch, there is a minimum limit on the spatial light modulator (18) to eyepiece lens (36) distance, imposing a limit on system compactness. The overall system can be made more compact for spatial light modulator (18) with smaller pixel pitches.

FIG. 10 illustrates the field distribution on the exit pupil plane (27). The viewing box (26) only contains rays that seem to emerge from 3D virtual objects or scenes that are intended to be displayed to the user. The CGH on the spatial light modulator (18) guarantees that the viewing box (26) contains only this set of rays. When the display device is in use, the eye pupil (19) of the user will substantially overlap with the viewing box (26) (ideally, eye pupil (19) should lie entirely inside the viewing box (26)) so that the user merely sees the desired content.

Other than the viewing box (26), the field distribution on the exit pupil plane (27) may include higher diffraction order replicas of the viewing box that emerge due to the pixelated nature of the spatial light modulator (18). In addition, there will be the noise beam (40), i.e. the region reserved to distribute the CGH encoding noise due to the restricted nature of the spatial light modulator (18) such as phase or amplitude only, etc. Finally, if the spatial light modulator (18) has less than 100% diffraction efficiency, the field will include unmodulated beam (37) as well. It is noted that for a pixelated spatial light modulator (18), the unmodulated beam (37) has higher undesired diffraction orders (38) as well.

For proper operation, the eye pupil (19) should be able to spatially filter out all beams other than the signal beam. That is, only the beam in the viewing box (26) should enter the eye, and the higher diffraction order replicas of the viewing box (26) (viewing box diffraction orders (39)), unmodulated beam (37), noise beam (40) and their higher diffraction order replicas (undesired diffraction orders (38)) must be filtered out. Otherwise, the retinal image observed by the user will be corrupted by background noise and shifted ghost replicas of the viewed content.

The system architecture must be designed such that when the user places the rotation center (eye rotation center (17)) of his/her eye (15) at the center of the spatial light modulator image (21), he/she should be able to eliminate all undesired beams with his eye pupil (19). In this respect, the viewing box (26) should be larger than the minimum expected size of the eye pupil (19) of the user, and the separation between higher diffraction order replicas on the eye pupil (19) plane should be larger than the minimum expected size of the eye pupil (19) of the user.

When the user rotates his eye (15), the new set of rays that are captured by the eye pupil (19) still form a spatial light modulator image (21) at the eye rotation center (17) and propagate to the retina to form a central vision image. Therefore, without any mechanical movement & change in the optical architecture, the system still delivers a holographic central vision.

FIG. 11 illustrates that the mere change required in the system upon a change in eye pupil (19) position is a change of the light source (11) in the light source array (25). In this manner, the unmodulated beams (37) of the spatial light modulator (18) as well as its higher diffraction order replicas are made to fall outside the eye pupil (19) and get filtered out. Actually, if the spatial light modulator (18) has 100% modulation efficiency (the unmodulated beam (37) does not emerge at all), then a single light source (11) rather than a switchable light source array (25) may be sufficient. In this option, brightness uniformity for different eye pupil (19) positions may be sustained by increasing the power of the light source (11) for off-axis eye pupil (19) positions.

According to a preferred embodiment of the present invention, the on/off operation mode of the respective light sources (11) is therefore directly dependent on the eye pupil (19) position. When a respective light source (11) is turned on, light from the light source (11) on the illumination lens (16) has a slightly shifted angle due to its relative orientation with respect to the lens principal axis and lens focal line. The predetermined stationary position of the spatial light modulator (18) on the first focal point ensures that an image reflected on said curved reflector (12) reaches the user eye (15) whose center is configured to be superimposed on the second focal point. As mentioned above, this configuration is found to substantially compensate for changed orientations of the eye pupil (19) provided that a respective light source (11) is activated based on the input by said pupil tracker (23).

The CGH on the spatial light modulator (18) is also updated so that the viewing box (26) is now located at the current position of eye pupil (19), and the appropriate view of the 3D virtual object or scene is displayed to the user.

FIG. 12 shows how a virtual object is displayed by the system for an on-axis eye pupil (19) position. The spatial light modulator (18) is illuminated with an oblique collimated wave. The part of CGH responsible for the displayed object point consists of a prism and a lens term, and converts (partly) the illumination wave to a converging wave focusing at the back focal plane of eyepiece lens (36). In other words, an intermediate image (35) is created at the back focal plane of the eyepiece lens (36). The eyepiece lens (36) creates a virtual image of the intermediate image (35) which appears at infinity to the user. In case the intermediate image (35) is created closer to the eyepiece lens (36), the virtual image appears at a distance closer than infinity. By controlling the relative position of the intermediate image (35) to the eyepiece lens (36), the display is able to show 3D objects appearing at different depths to the user.

It is also noted that the light source (11) within the light source array (25) is selected such that its image on the pupil plane (that image will be physically created unless the spatial light modulator image has 100% modulation efficiency: the unmodulated beam (37)) falls outside the eye pupil (19).

FIG. 13 shows the reconstruction of the virtual object point for an off-axis eye pupil (19) position. Only the virtual object point that is imaged on the fovea of the user is shown. Since the spatial light modulator (18) is imaged to the eye rotation center (17) (i.e. the eyepiece lens (36) forms an image of the spatial light modulator image (21) at the eye rotation center (17)), it is possible for the spatial light modulator (18) to display the central vision image without any change in the optical configuration of the system, hence no mechanical movements. The main difference from the previous case is that, the modified CGH generates the intermediate image (35) at an off-axis position. The light source (11) of the light source array (25) is also changed so that its image on the pupil plane falls outside the eye pupil (19) and hence gets filtered out.

FIG. 14 illustrates an embodiment where a second spatial filter (optical spatial filter (41)) is used in the system so that undesired beams are filtered out before they reach the pupil plane. Similar to previous embodiments, the spatial light modulator (18) is imaged by the eyepiece lens (36) and a spatial light modulator image (21) is formed at the eye rotation center (17).

In a preferred embodiment, the light source array (25) and thus the light source (11) are imaged by a modified illumination lens (16) at a plane different than the eye pupil (19) plane, where an active optical spatial filter (32) is placed. The optical spatial filter (41) may be implemented as a binary liquid crystal shutter where the open window is steered. Such a window blocks the unmodulated beam (37) and other higher order replicas, and lets through only the signal wave that would reach the eye pupil (19) and form the retinal image.

An option is to place the optical spatial filter (41) on an intermediate image plane, but this is not the only option. In general, the optical spatial filter (41) can be placed at any plane at which it is convenient to sort the signal beam from undesired beams. In a particular option, the optical spatial filter (41) may be attached to, or directly implemented on, the eyepiece lens (36).

For an off-axis eye pupil (19) position illustrated in FIG. 15, the active optical spatial filter (41) is reconfigured such that the open window is shifted to a corresponding off-axis position to let through the shifted signal wave. Higher order replicas of signal waves and unmodulated beam (37) are eliminated before reaching the eye pupil (19). It is noted that the light source (11) within the light source array (25) is switched in accordance with the eye pupil (19) position as usual.

FIG. 16 shows that the illumination wave of the spatial light modulator (18) can be a diverging wave as well as collimated or converging. In this particular exemplar embodiment, no lens is placed between the spatial light modulator (18) and the light source array (25); hence, the diverging wave from the light source (11) directly illuminates the spatial light modulator (18). For best pupil filtering performance, the eyepiece lens (36) should form an image of the point light source (11) on the eye pupil (19) plane, outside the pupil position (i.e. the unmodulated beam (37) should get focused on the eye pupil (19) plane). In case the point source is not imaged on the eye pupil (19) plane, some portion of the unmodulated beam (37) may fall inside the eye pupil (19) and corrupt the retinal image partially. Also, the holograms on the spatial light modulator (18) should be computed according to the diverging illumination wave. Other than that, the system functions as in previous cases.

FIG. 17 illustrates an alternative architecture in which the spatial light modulator (18) is first transformed by a demagnifier (42) (i.e. a negative lens in this case) into a transformed spatial light modulator (43). Said transformed spatial light modulator (43), which is a virtual demagnified image of the actual spatial light modulator (18) in this figure, has a smaller size and smaller pixel pitch. The eyepiece lens (36) is now designed to image the transformed spatial light modulator (43) at the eye rotation center (17).

Due to its smaller pixel pitch, the diffraction orders of the demagnified virtual spatial light modulator (43) are separated faster than the actual spatial light modulator (18). In this way, the demagnification requirement of the eyepiece lens (36) is relaxed, and the overall system can be made more compact.

FIG. 18 illustrates an alternative architecture where the demagnifier (42) is implemented by a positive lens. The transformed spatial light modulator (43) now becomes equivalent to a real, demagnified and inverted image of the actual spatial light modulator (18). The transformed spatial light modulator (43) is then imaged by the eyepiece lens (36) to the eye rotation center (17).

Figure 1:
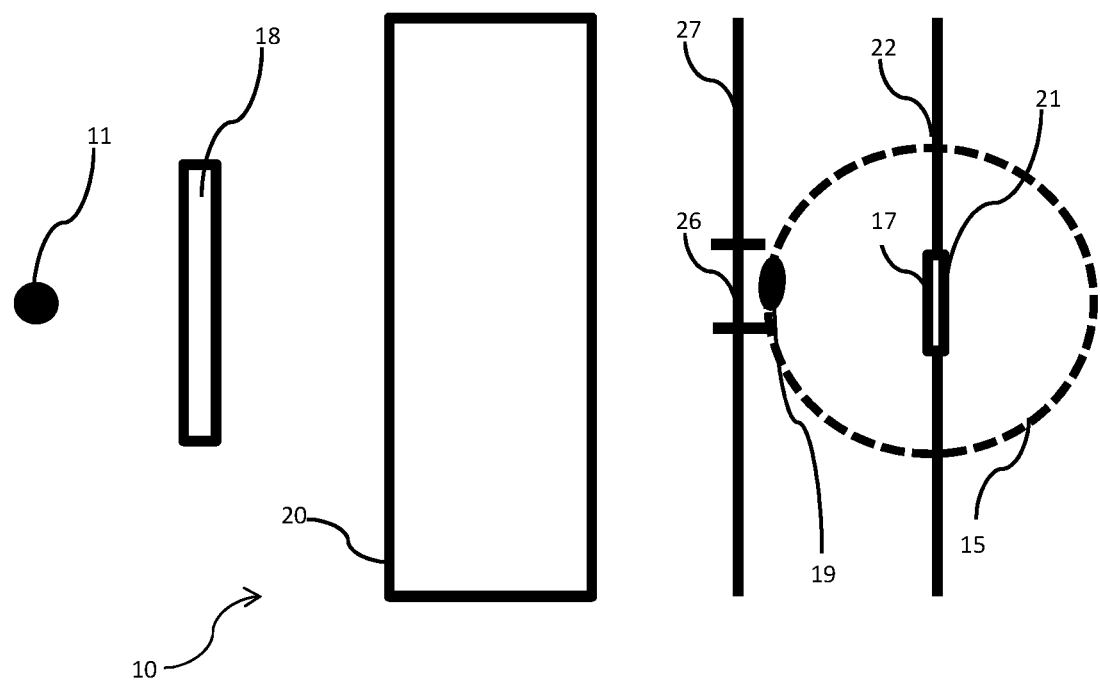
Figure 2:
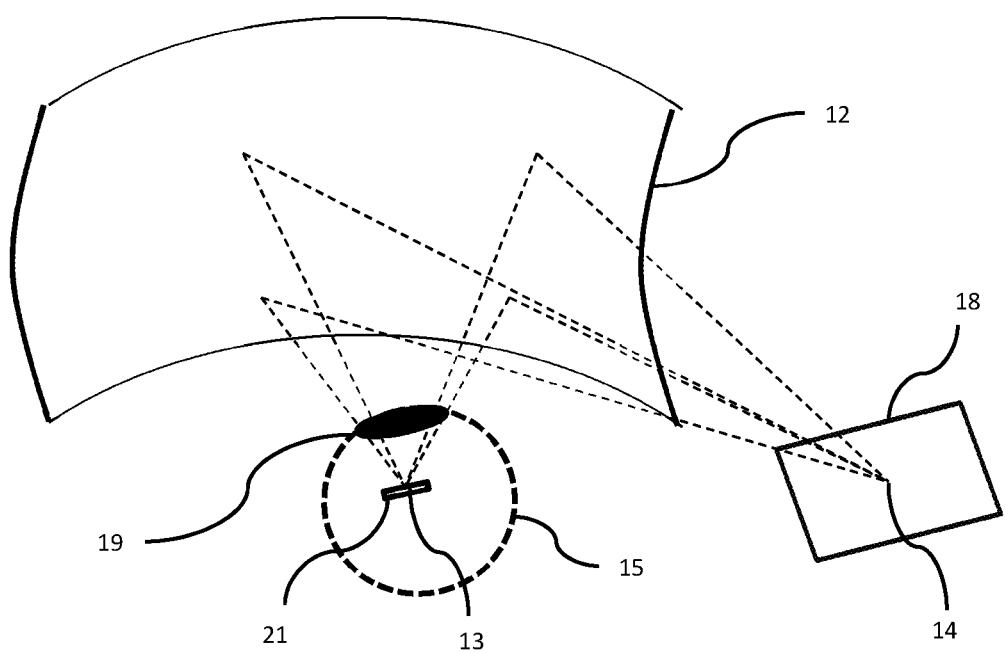
Figure 3:
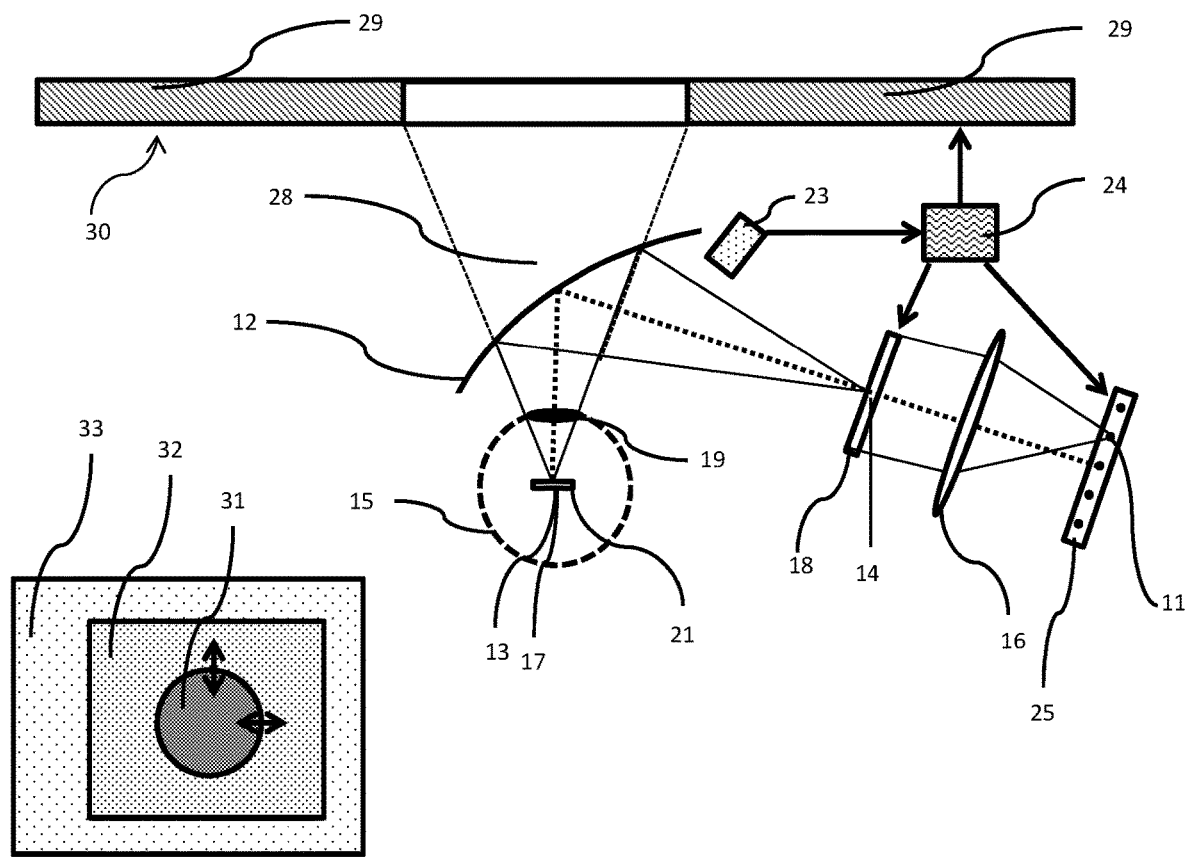
Figure 4:
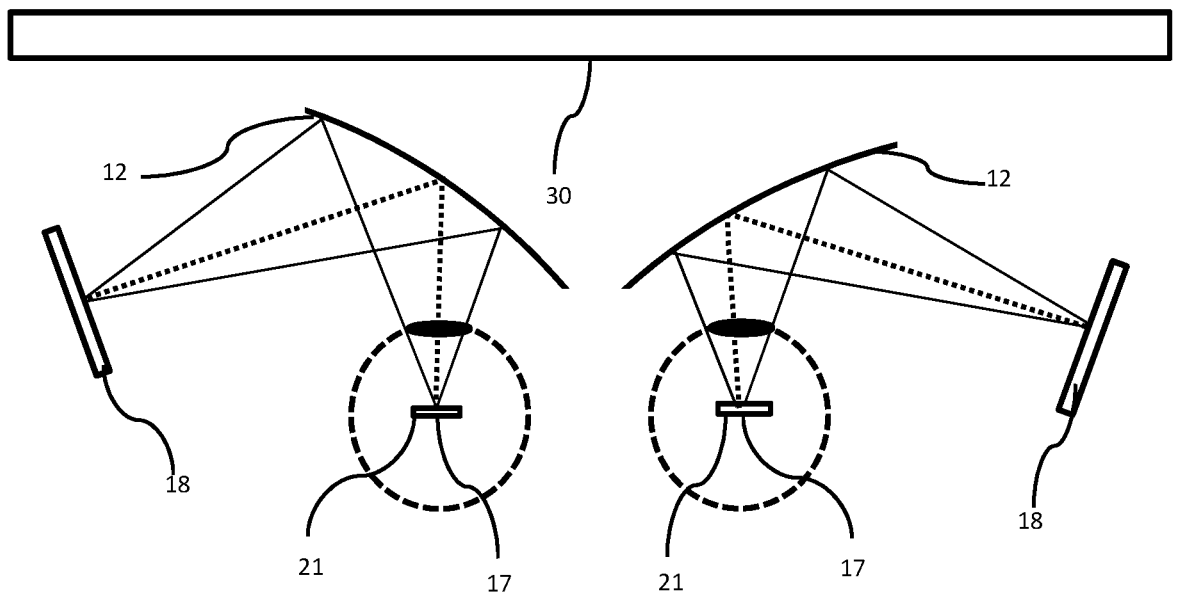
Figure 5:
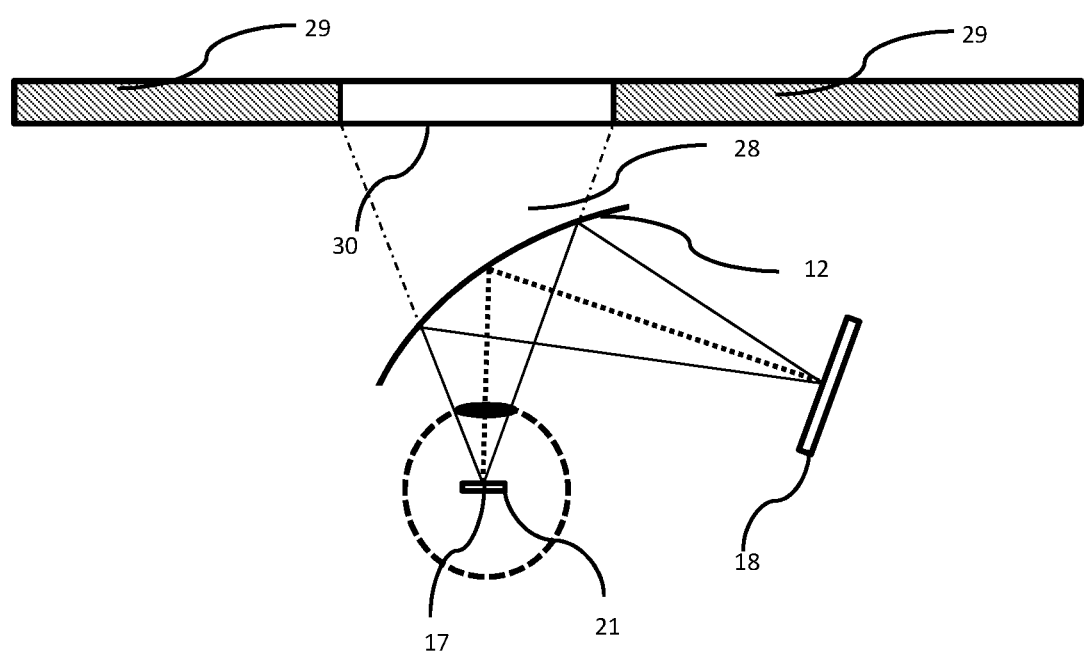
Figure 6:
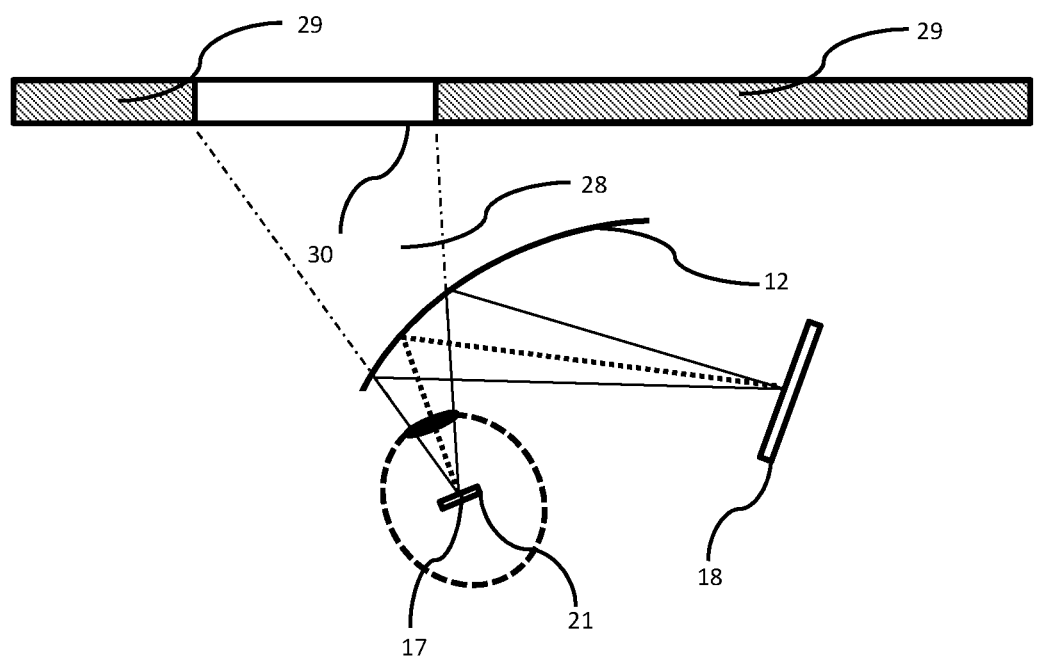
Figure 7:
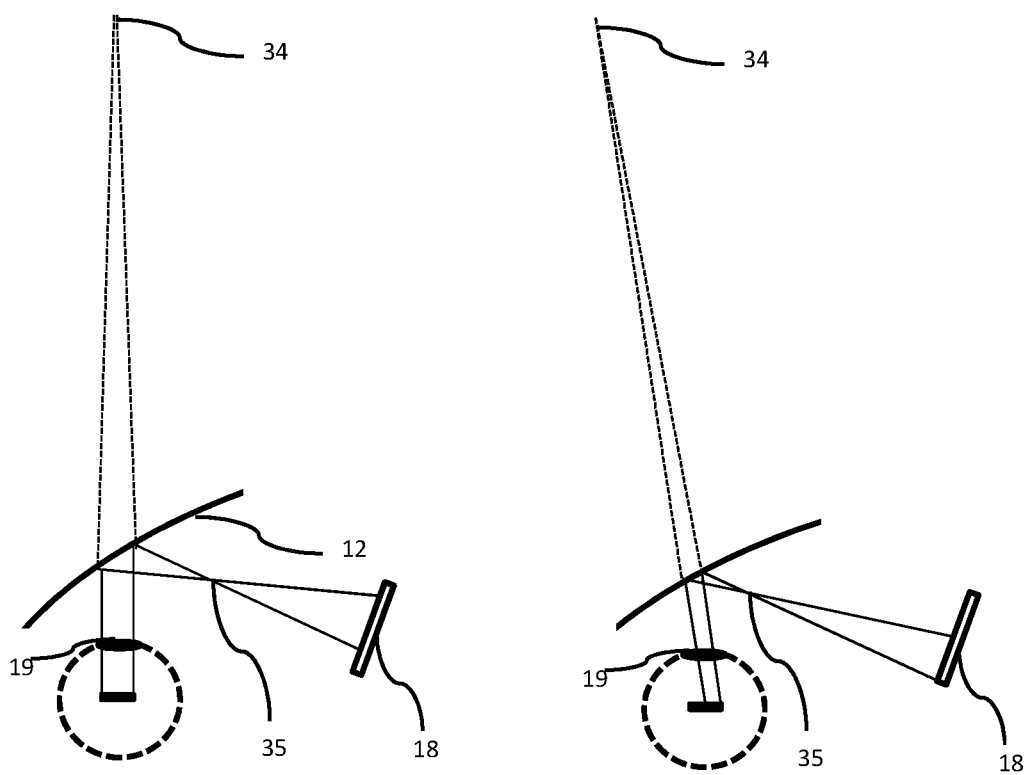
Figure 8:
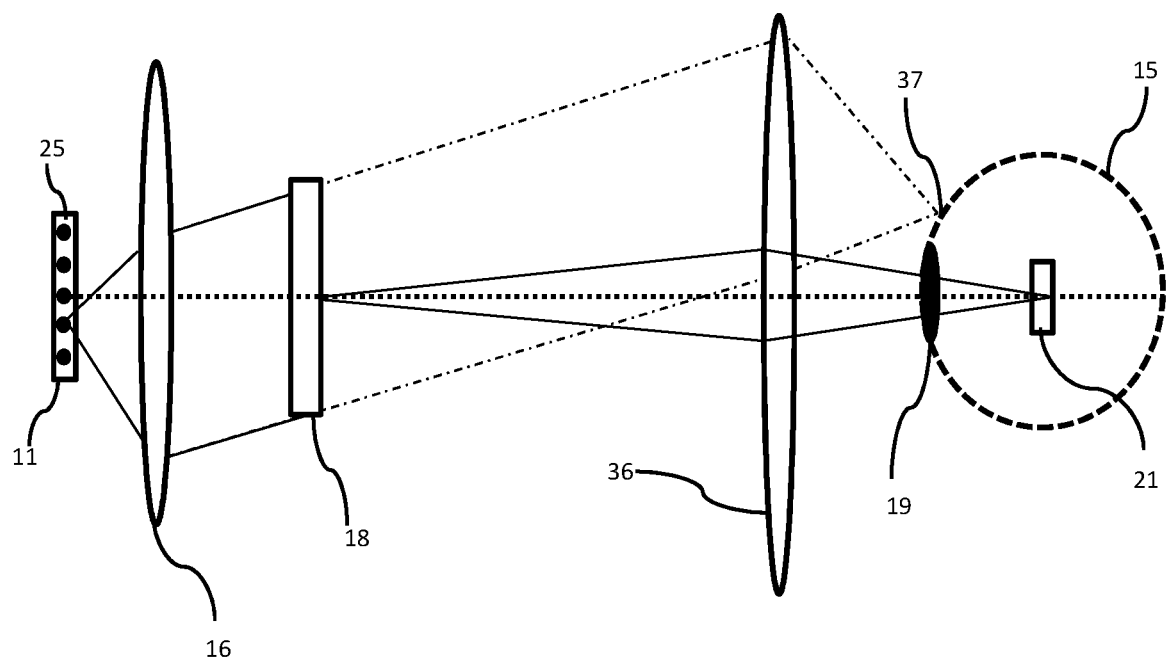
Figure 9:
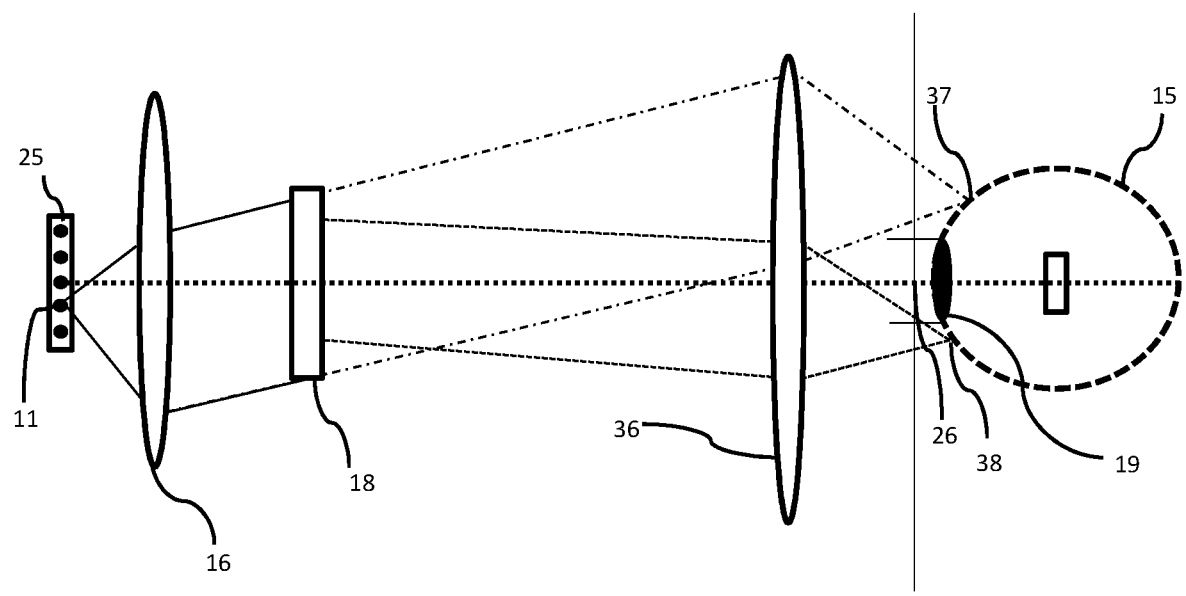
Figure 10:
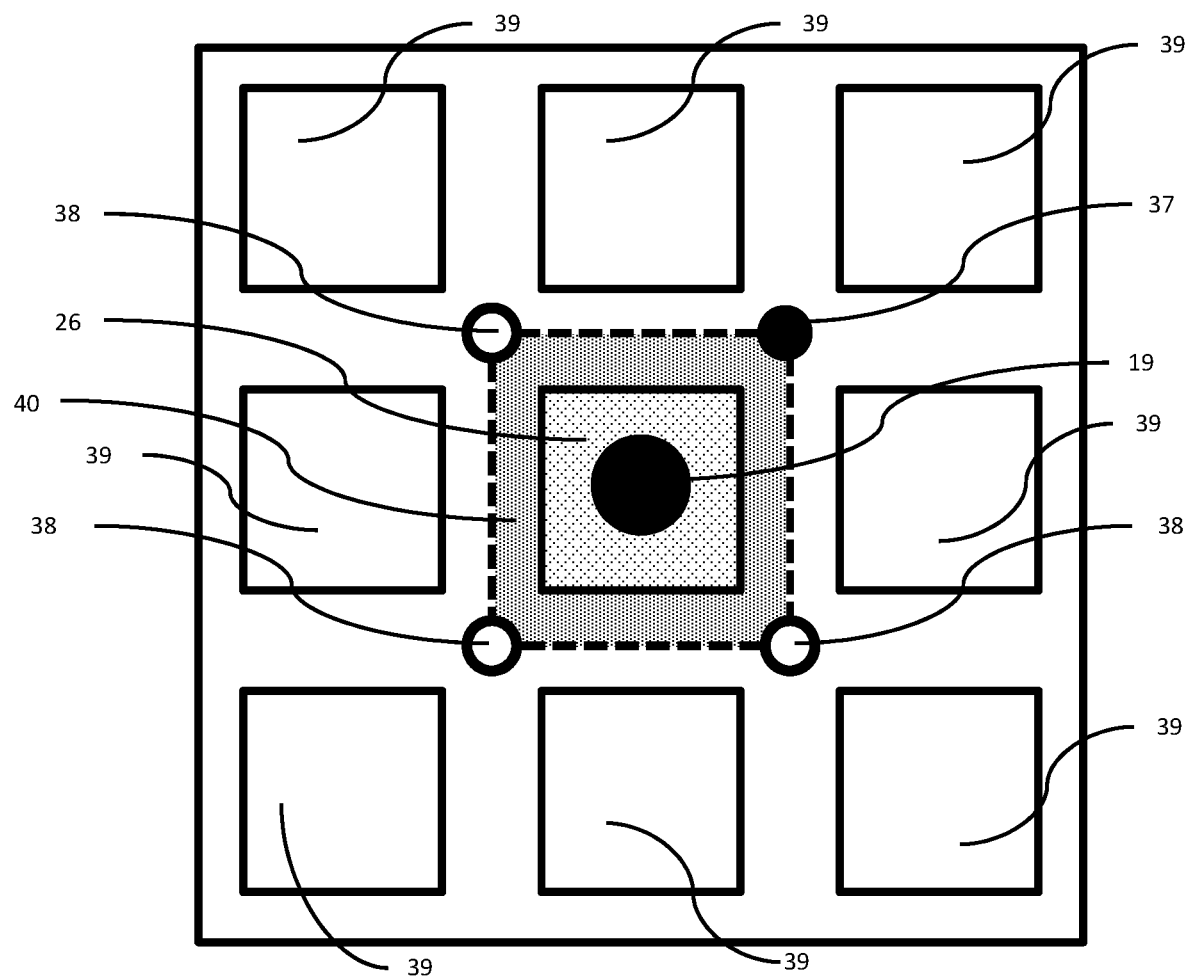
Figure 11:
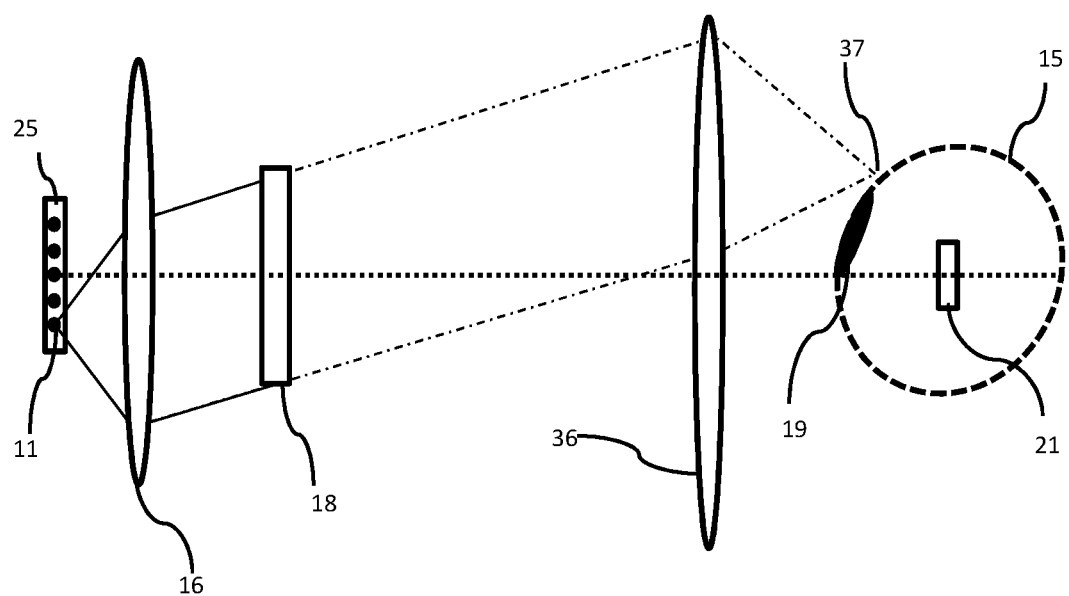
Figure 12:
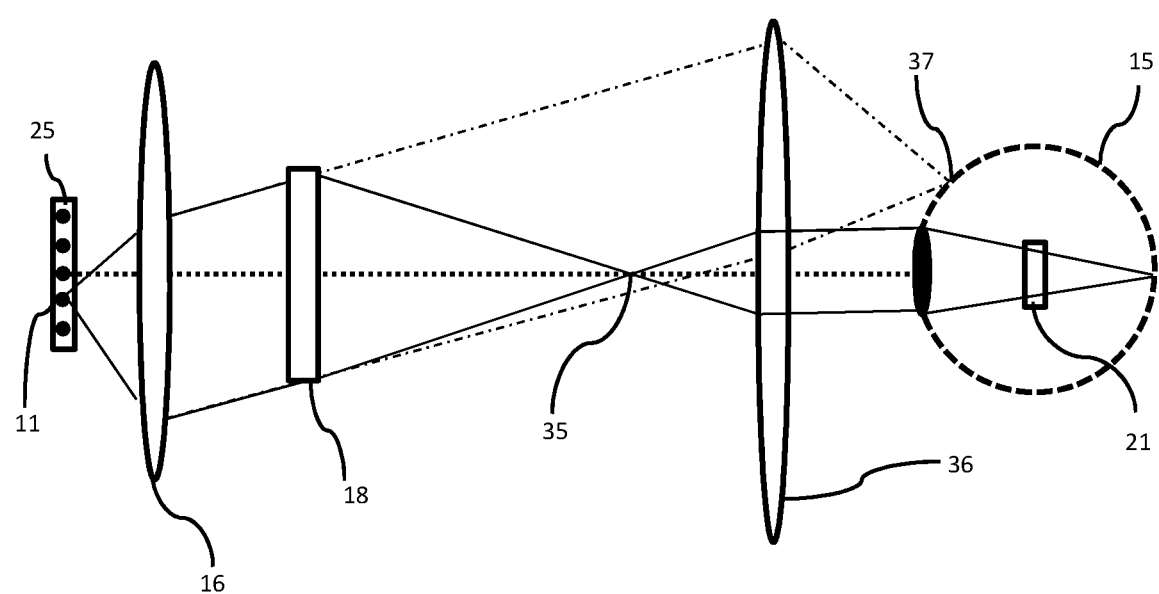
Figure 13:
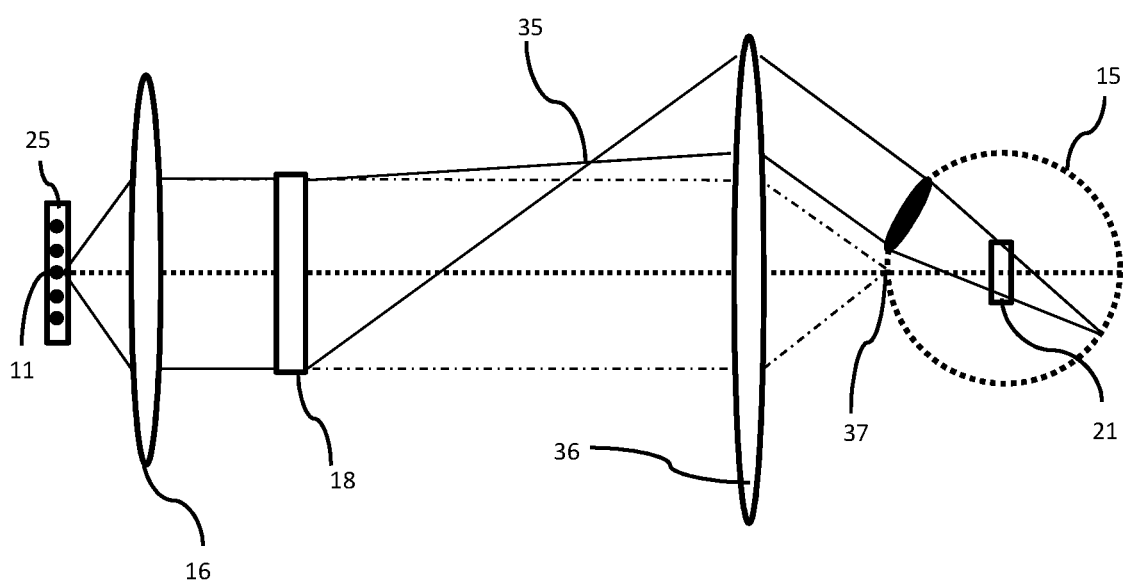
Figure 14:
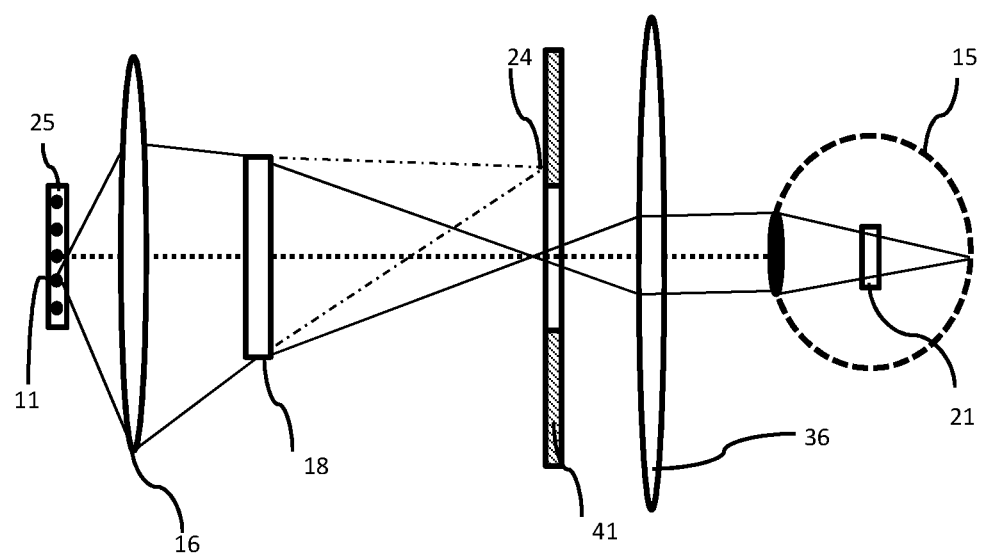
Figure 15:
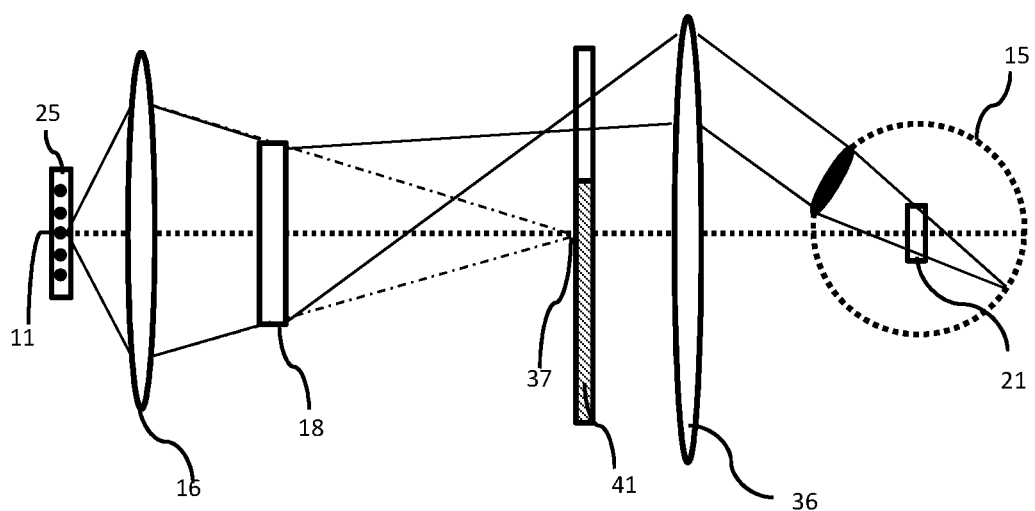
Figure 16:
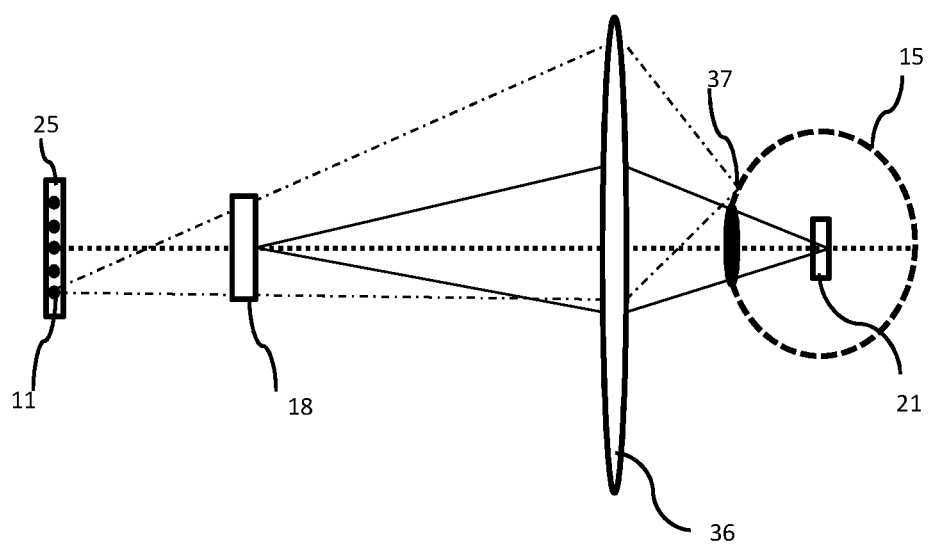
Figure 17:
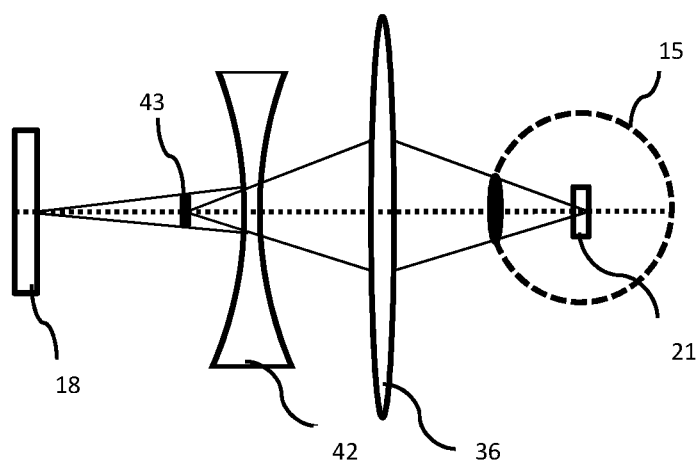
Figure 21:
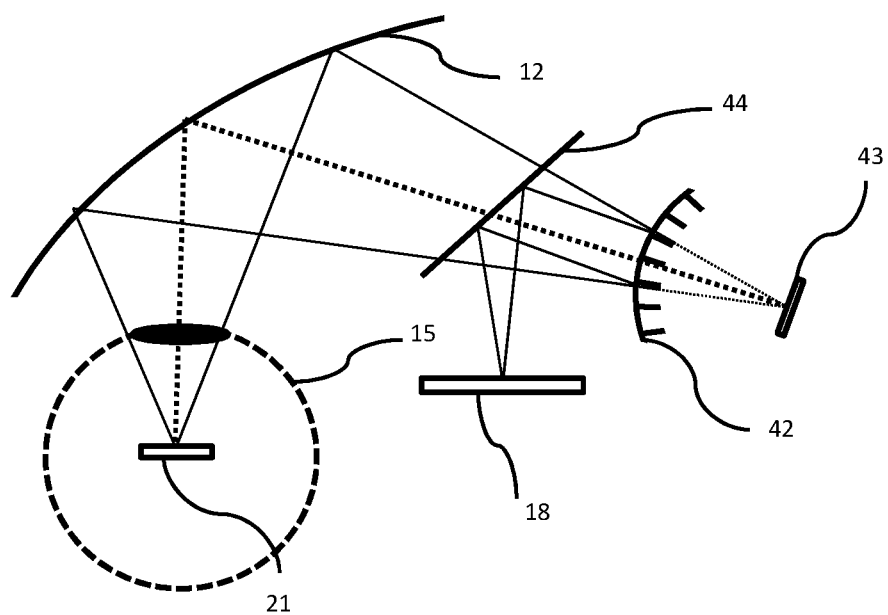

FIG. 21 shows an off-axis version of the architecture in FIG. 17, where the eyepiece lens (36) is replaced by a curved reflector (12) in the form of an elliptical mirror and the demagnifier (42) is implemented by a convex mirror. It is noted that the transformed spatial light modulator (43) forms at the back of the demagnifier (42) and is equivalent to a demagnified virtual image of the actual spatial light modulator (18).

Figure 18:
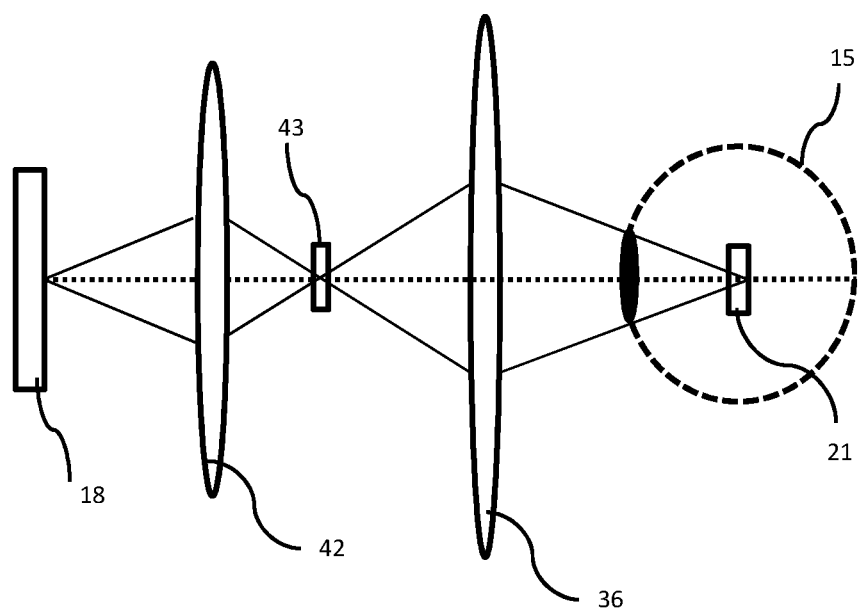
Figure 19:
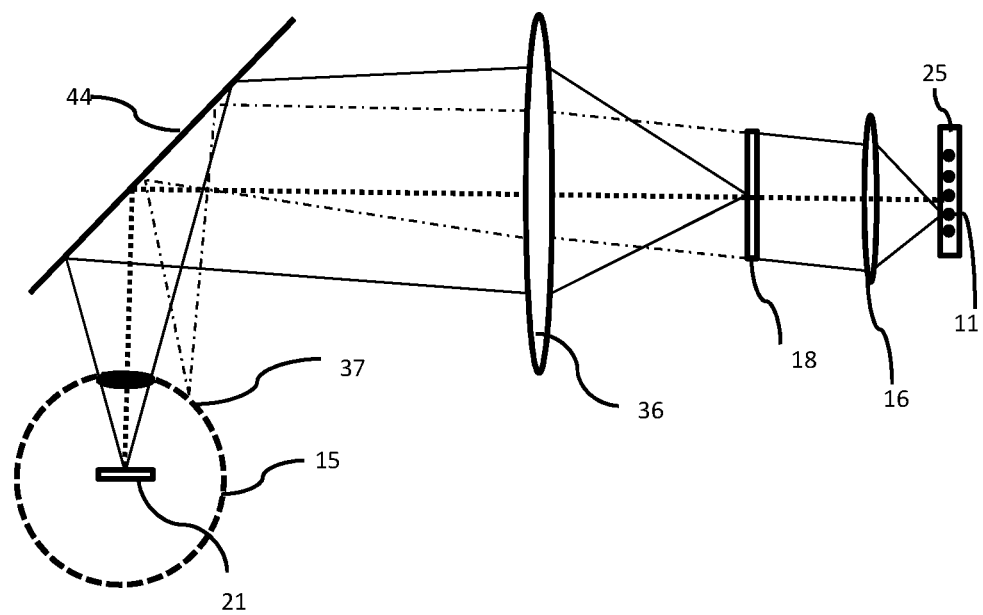
FIG. 19 illustrates a variation of FIG. 8 where the system is made see through by a beam-splitter (44) placed between the eyepiece lens (36) and eye (15). The transparent nature of beam-splitter (44) enables augmented reality mode of operation.
Figure 22:
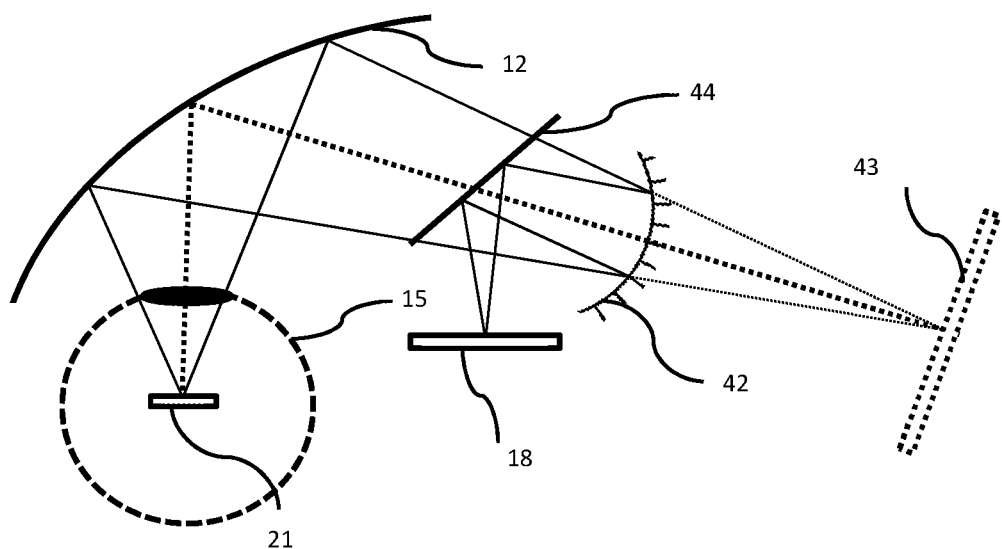

FIG. 22 shows an off-axis version of the architecture in FIG. 18, where the eyepiece lens (36) is replaced by the curved reflector (12) in the form of an elliptical mirror and the demagnifier (42) is implemented by a concave mirror. It is noted that the transformed spatial light modulator (43) forms at the back of the demagnifier (42) and is equivalent to a magnified virtual image of the actual spatial light modulator (18). Though it is magnified, the transformed spatial light modulator (43) appears at a larger distance to the curved reflector (12), and hence the size of the image of the spatial light modulator (21) that forms at the eye rotation center (17) can be controlled as desired.

Figure 20:
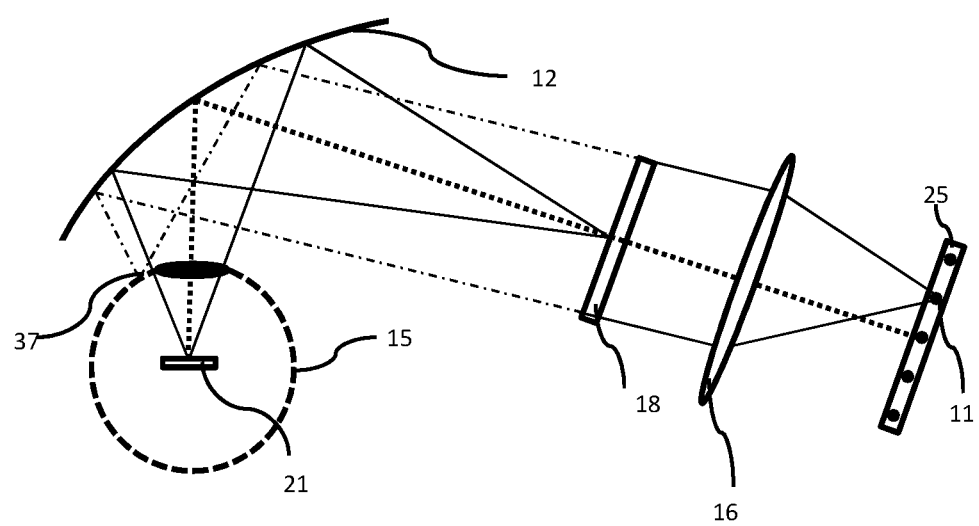
FIG. 20 shows an off-axis version of the architecture in FIG. 8, where the eyepiece lens (36) is replaced by a curved reflector (12) in the form of ellipsoid. Other off axis variations may replace the eyepiece lens (36) with a paraboloid mirror, or a planar diffractive off-axis Fresnel lens.
Figure 23:
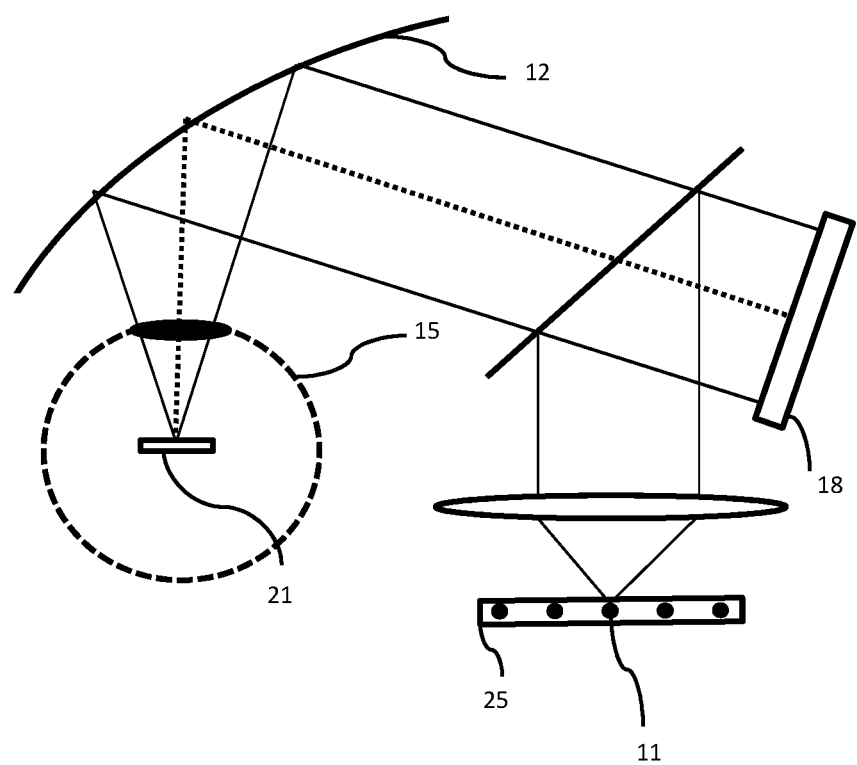

FIG. 23 shows a version of the architecture in FIG. 20, where the spatial light modulator (18) is reflective rather than transmissive. In all presented configurations, reflective and transmissive spatial light modulators (18) can be utilized with modifications or inclusions of components such as beam-splitters etc.

Figure 24:
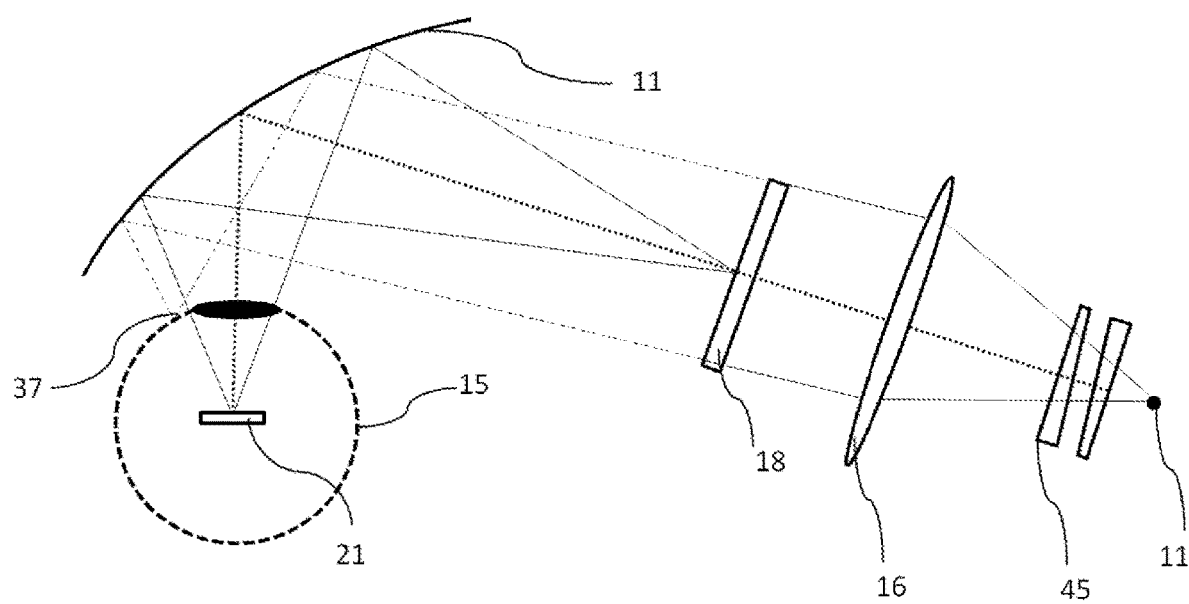

FIG. 24 shows an embodiment where a rotatable prismatic optical element (45) is placed in front of a stationary light source (11) so as to implement the functionality of the light source array (25) and follow the movements of the eye pupil (19) of the user. The rotatable prismatic optical element (45) effectively forms a shifted virtual image of the point light source (11) that appears at the same depth. By varying the rotation angles of the prisms of the rotatable optical element, the virtual image of the point light source can be steered on the plane of the light source. In case the rotatable prismatic optical element (45) consists of a single prism, the virtual image of the point light source (11) can be steered over a circle. If a second prism is used in conjunction with the first one, the first prism determines a center location, and the second prism enables steering over a circular path around that center, and in this way a broader range of points can be addressed.

The rotatable prismatic optical element can also be placed between the illumination lens (16) and spatial light modulator (18) as well, or at any plane between the light source (11) and eye pupil (19) plane. In some embodiments, multiple rotatable prismatic elements, each consisting of one or more prisms, may be deployed at several locations in the optical train between the point light source (11) and exit pupil plane (27).

Figure 25:
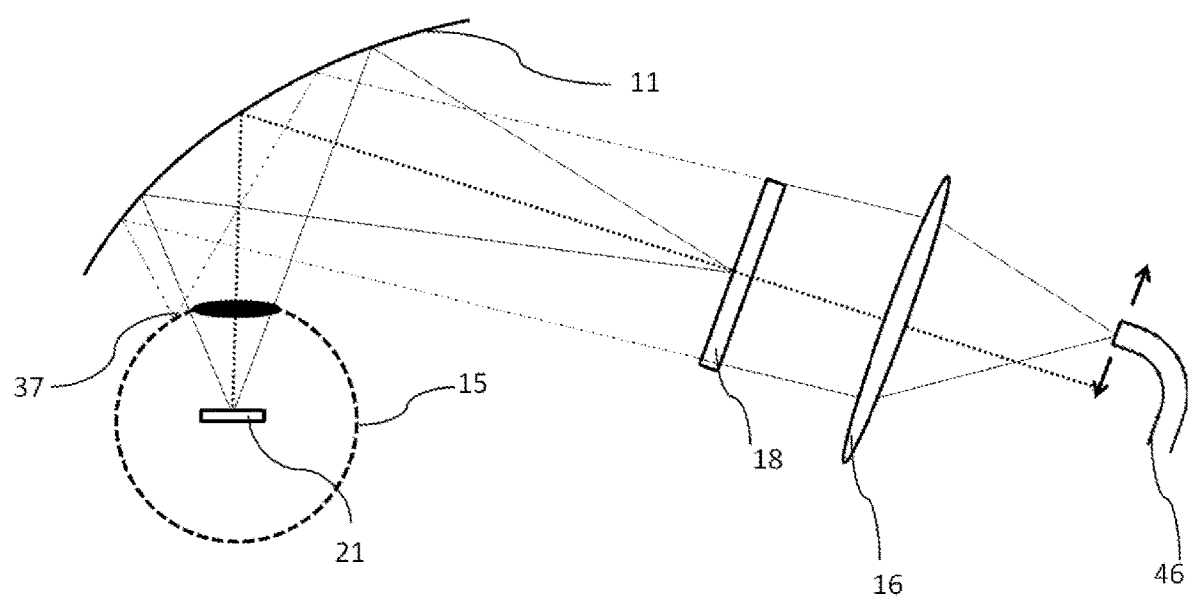

FIG. 25 shows an embodiment where the point light source (11) is implemented with a fiber coupled light source (46). The tip of the fiber can be actuated to move on a planar or curved surface so as to follow the movements of the eye pupil (19) of the user.

In some embodiments, spatial light modulator (18) data is computed real-time as it is displayed. In these embodiments, an electronics module computes the spatial light modulator (18) data and drives the spatial light modulator (18) with the spatial light modulator data to create a virtual scene in real-time. The real-time spatial light modulator (18) data may be a function of head tracking data, pupil tracking data, and environmental data.

In other embodiments, spatial light modulator (18) data is precomputed and stored for retrieval at display time. For example, spatial light modulator (18) data for an entire virtual environment may be precomputed and stored. As a user traverses the virtual environment, the appropriate spatial light modulator (18) data is retrieved and displayed.

In still further embodiments, portions of the spatial light modulator (18) data are precomputed, and portions of the spatial light modulator (18) data are computed real-time. A near-to-eye display device (10) comprising a light modulator unit and an optical imaging is proposed as explained below:

The near-to-eye display device (10) comprises a light modulator unit and an optical imaging module. Said light modulator unit consists of at least one light source (11) and a spatial light modulator (18), which displays computer generated holograms to spatially modulate the light incident from said light source (11). Further, said optical imaging module comprises at least one imaging lens (20) capturing rays modulated by the spatial light modulator (18) and forming a spatial light modulator image (21) at a spatial light modulator image plane (22).

In a nutshell, the present invention proposes a near-to-eye display device (10) comprising a plurality of light sources (11), at least one spatial light modulator (18) which modulates light received from said at least one light source (11) illuminating said spatial light modulator (18) and at least one imaging lens (20) capturing rays modulated by the spatial light modulator (18) and forming a spatial light modulator image (21) at a spatial light modulator image plane (22) such that the said spatial light modulator image plane (22) is conjugated to an eye rotation center (17) of a user's eye (15) when the display is in use.

In one aspect of the present invention, a light modulator unit consist of at least one light source (11), a spatial light modulator (18), which displays computer generated holograms to spatially modulate the light incident from said one light source (11).

In another aspect of the present invention, said optical imaging module comprises at least one imaging lens (20) capturing rays modulated by the spatial light modulator (18) and forming a spatial light modulator image (21) at a spatial light modulator image plane (22); and wherein the spatial light modulator image (21) substantially overlaps with an eye rotation center (17) of a human eye (15); and wherein said imaging lens (20) is disposed relative to eye pupil (19) of said human eye (15) such that a viewing box (26) is formed at an exit pupil plane (27) between the imaging lens (20) and said spatial light modulator image plane (22); and wherein said eye pupil (19) entirely lie inside said viewing box (26).

In another aspect of the present invention, said light source (11) is activated at a single time in dependence with the eye pupil (19) position such that said eye pupil (19) entirely lie inside said viewing box (26) and said eye rotation center (17) substantially overlaps with the center of the spatial light modulator image (21).

In a further aspect of the present invention, computer generated holograms displayed by said spatial light modulator (18) are computed such that the viewing box (26) formed at the exit pupil plane (27) is shifted by a new computer generated hologram according to the new position of the eye pupil (19).

In a further aspect of the present invention, said exit pupil plane (27) includes the viewing box (26) and undesired replicas of said viewing box, the center of the undesired replicas of the viewing box (26) being at least 2 mm away from the center of the viewing box (26), and the distance from the exit pupil plane (27) to the spatial light modulator image (21) is in the range 8-14 mm.

In a further aspect of the present invention, said device further comprises a display (30) having peripheral vision (29) regions, surrounding a central vision (28) region provided by said spatial light modulator (18).

In a further aspect of the present invention, said peripheral vision (29) regions provide a predetermined resolution vision and said peripheral vision is darkened in the central vision (28) region of said display (30).

In a further aspect of the present invention, said display (30) is transparent.

In a further aspect of the present invention, said imaging lens (20) is a curved reflector (12).

In a further aspect of the present invention, said curved reflector (12) is transparent.

In a further aspect of the present invention, said spatial light modulator (18) spatially modulates the phase, the intensity, or a combination of the incident light from the light source (11).

In a further aspect of the present invention, said curved reflector (12) is part of a geometrical form consisting an ellipsoid or freeform optical surface that is placed in front of the eye (15) such that said eye rotation center (17) is placed at one focal point of the geometrical form and the spatial light modulator (18) is placed at the other focal point of the geometrical form. The geometrical form is a reflective optical element that is reflective or partially reflective or trans-reflective. In a preferred embodiment, the geometrical form has wavelength selective optical reflective coatings at predetermined light source wavelengths or holographic coatings.

In a further aspect of the present invention, said device comprises a pupil tracker (23) tracking displacements of the eye pupil (19) position and a computer (24) effectuates control of said at least one light source (11) in a light source array (25).

In a further aspect of the present invention, said light source (11) is coupled to an optical fiber.

In a further aspect of the present invention, said light source (11) is movable in response to changes in the position of the eye pupil (19).

In a further aspect of the present invention, at least one light source (11) is an optical fiber that is movable to follow the displacements of the eye pupil (19).

In a further aspect of the present invention, in accordance with the detected eye pupil (19) position, the computer (24) sends signals to said light source array (25) such that one light source (11) is selectively activated at one time, spatial light modulator (18) such that a new computer generated hologram is uploaded and, display (30) such that a desired peripheral vision (29) region is arranged and a desired peripheral vision (29) image is delivered.

In a further aspect of the present invention, a rotatable prismatic optical element (45) is used in the optical train between the light source and the exit pupil plane to follow the displacements of the eye pupil (19).

In a further aspect of the present invention, an illumination lens (16) is placed between the light source (11) and spatial light modulator (18) to provide a collimated plane wave or converging illumination to the spatial light modulator (18).

In a further aspect of the present invention, collimated illumination wave derived from the light source (11) via the illumination lens (16) hits the spatial light modulator (18) and part of the illumination wave in the form of unmodulated beam (37) remains collimated after passing from the spatial light modulator (18) so as to get focused on the exit pupil plane (27) at a point outside the eye pupil (19).

In a further aspect of the present invention, the imaging lens (20) is an on-axis or off-axis eyepiece lens (36).

In a further aspect of the present invention, higher diffraction order replicas of the spatial light modulator (18) are separated by more than the eye pupil (19) size on the exit pupil plane (27) in the manner that said spatial light modulator image (21) have sufficiently small pixels wherein when it is placed at the eye rotation center (17), said higher diffraction order replicas are separated wide enough to be spatially filtered by the eye pupil (19).

In a further aspect of the present invention, the ratio of the distance between eyepiece lens (36) and eye rotation center (17) to the distance between spatial light modulator (18) and eyepiece lens (36) is variable to adjust demagnification.

In a further aspect of the present invention, the viewing box (26) is larger than a minimum preconfigured size of the eye pupil (19) and the separation between higher diffraction order replicas on the eye pupil (19) plane are larger than the minimum preconfigured size of the eye pupil (19).

In a further aspect of the present invention, a negative lens in the form of a demagnifier (42) is placed between the spatial light modulator (18) and the imaging lens (20) in the manner that the spatial light modulator (18) is first transformed by said demagnifier (42) into a transformed spatial light modulator (43) and said imaging lens (20) is configured to image said transformed spatial light modulator (43) at the eye rotation center (17).

In a further aspect of the present invention, said imaging lens (20) is replaced by a curved reflector (12) in the form of an elliptical mirror and the demagnifier (42) is implemented by a convex mirror such that the transformed spatial light modulator (43) forms at the back of the demagnifier (42).

In a further aspect of the present invention, the device comprises an active optical spatial filter (41) between the eyepiece lens (36) and the spatial light modulator (18) to filter out undesired beams before they reach the exit pupil plane (27).

In a further aspect of the present invention, the optical spatial filter (41) is a binary liquid crystal shutter where the open window thereof is steerable.

In a further aspect of the present invention, said spatial light modulator (18) data is computed to create virtual scene in real-time as it is displayed.

In a further aspect of the present invention, said real-time spatial light modulator (18) data is a function of head tracking data, pupil tracking data or environmental data.

In a further aspect of the present invention, said near-to-eye display device (10) is a monochrome display device and light source (11) generates a coherent light wave of a single color.

In a further aspect of the present invention, said near-to-eye display device (10) is a full color display device and light source (11) generates coherent light waves of different wavelengths in a time sequential manner.

In a further aspect of the present invention, said light source array (25) is located behind the spatial light modulator (18) and comprises at least three light sources (11).

In a further aspect of the present invention, the optical spatial filter (41) is placed on an intermediate image plane formed between the eyepiece lens (36) and the spatial light modulator (18).

In a further aspect of the present invention, the optical spatial filter (41) is attached to or directly implemented on said eyepiece lens (36).

In a further aspect of the present invention, a positive lens in the form of a demagnifier (42) is placed between the spatial light modulator (18) and the imaging lens (20).

In a further aspect of the present invention, the imaging lens (20) is replaced by a curved reflector (12) in the form of an elliptical mirror and the demagnifier (42) is implemented by a concave mirror such that the transformed spatial light modulator (43) forms at the back of the demagnifier (42).

In a further aspect of the present invention, a beam-splitter (44) is placed between the eyepiece lens (36) and eye (15).

In a further aspect of the present invention, said imaging lens (20) is a curved reflector (12), a paraboloid mirror, or a planar diffractive off-axis Fresnel lens in an off-axis configuration of the near-to-eye display device (10).

In a further aspect of the present invention, said spatial light modulator (18) is reflective or transmissive.

In a further aspect of the present invention, said light sources (11) are equally spaced-away from each other.

In a further aspect of the present invention, a head-mountable display device comprising a near-to-eye display device (10) is proposed.

The invention claimed is:

1. A near-to-eye display device (10) comprising a light modulator unit and an optical imaging module characterized in that;
   said light modulator unit consists of at least one light source (11), a spatial light modulator (18), which displays computer generated holograms to spatially modulate the light incident from said one light source (11);
   said optical imaging module comprises at least one imaging lens (20) capturing rays modulated by the spatial light modulator (18) and forming a spatial light modulator image (21) at a spatial light modulator image plane (22);
   wherein the spatial light modulator image (21) substantially overlaps with an eye rotation center (17) of a human eye (15);
   wherein said imaging lens (20) is disposed relative to eye pupil (19) of said human eye (15) such that a viewing box (26) is formed at an exit pupil plane (27) between the imaging lens (20) and said spatial light modulator image plane (22) and;
   wherein said eye pupil (19) entirely lie inside said viewing box (26) when said near-to-eye display device (10) is in use.

2. A near-to-eye display device (10) as set forth in claim 1, characterized in that said light source (11) is activated at a time in dependence with the eye pupil (19) position such that said eye pupil (19) entirely lie inside said viewing box (26) and said eye rotation center (17) substantially overlaps with the center of the spatial light modulator image (21).

3. A near-to-eye display device (10) as set forth in claim 1, characterized in that computer generated holograms displayed by said spatial light modulator (18) are computed such that the viewing box (26) formed at the exit pupil plane (27) is shifted by a new computer generated hologram according to the new position of the eye pupil (19).

4. A near-to-eye display device (10) as set forth in claim 1, characterized in that said exit pupil plane (27) includes the viewing box (26) and undesired replicas of said viewing box, the center of the undesired replicas of the viewing box (26) being at least 2 mm away from the center of the viewing box (26), and the distance from the exit pupil plane (27) to the spatial light modulator image (21) is in the range 8-14 mm.

5. A near-to-eye display device (10) as set forth in claim 1, characterized in that said device further comprises a display (30) having peripheral vision (29) regions, surrounding a central vision (28) region provided by said spatial light modulator (18).

6. A near-to-eye display device (10) as set forth in claim 5, characterized in that said peripheral vision (29) regions provide a predetermined resolution vision and said peripheral vision is darkened in the central vision (28) region of said display (30).

7. A near-to-eye display device (10) as set forth in claim 5, characterized in that said display (30) is partially transparent.

8. A near-to-eye display device (10) as set forth in claim 1, characterized in that said imaging lens (20) is a curved reflector (12).

9. A near-to-eye display device (10) as set forth in claim 8, characterized in that said curved reflector (12) is partially transparent.

10. A near-to-eye display device (10) as set forth in claim 8, characterized in that said curved reflector (12) is part of a geometrical form consisting of an ellipsoid or freeform optical surface that is placed in front of the eye (15) such that said eye rotation center (17) is placed at one focal point of the geometrical form and the spatial light modulator (18) is placed at the other focal point of the geometrical form.

11. A near-to-eye display device (10) as set forth in claim 1, characterized in that said spatial light modulator (18) spatially modulates the phase, the intensity, or a combination of the incident light from the light source (11).

12. A near-to-eye display device (10) as set forth in claim 1, characterized in that said device comprises a pupil tracker (23) tracking displacements of the eye pupil (19) position and a computer (24) effectuates control of said at least one light source (11) in a light source array (25).

13. A near-to-eye display device (10) as set forth in claim 12, characterized in that in accordance with the detected eye pupil (19) position, the computer (24) sends signals to:
(i) said light source array (25) such that one light source (11) is selectively activated at one time,
(ii) spatial light modulator (18) such that a new computer generated hologram is uploaded and,
(iii) display (30) such that a desired peripheral vision (29) region is arranged and a desired peripheral vision (29) image is delivered.

14. A near-to-eye display device (10) as set forth in claim 12, characterized in that said light source array (25) is located behind the spatial light modulator (18) and comprises at least three light sources (11).

15. A near-to-eye display device (10) as set forth in claim 14, characterized in that said light sources (11) are equally spaced-away from each other.

16. A near-to-eye display device (10) as set forth in claim 1, characterized in that said light source (11) is coupled to an optical fiber.

17. A near-to-eye display device (10) as set forth in claim 1, characterized in that said light source (11) is movable in response to changes in the position of the eye pupil (19).

18. A near-to-eye display device (10) as set forth in claim 1, characterized in that at least one light source (11) is an optical fiber that is movable to follow the displacements of the eye pupil (19).

19. A near-to-eye display device (10) as set forth in claim 1, characterized in that a rotatable prismatic optical element (45) is used in the optical train between the light source and the exit pupil plane to follow the displacements of the eye pupil (19).

20. A near-to-eye display device (10) as set forth in claim 1, characterized in that an illumination lens (16) is placed between the light source (11) and spatial light modulator (18) to provide a collimated plane wave or converging illumination to the spatial light modulator (18).

21. A near-to-eye display device (10) as set forth in claim 20, characterized in that collimated illumination wave derived from the light source (11) via the illumination lens (16) hits the spatial light modulator (18) and part of the illumination wave in the form of unmodulated beam (37) remains collimated after passing from the spatial light modulator (18) so as to get focused on the exit pupil plane (27) at a point outside the eye pupil (19).

22. A near-to-eye display device (10) as set forth in claim 1, characterized in that the imaging lens (20) is an on-axis or off-axis eyepiece lens (36).

23. A near-to-eye display device (10) as set forth in claim 22, characterized in that the ratio of the distance between eyepiece lens (36) and eye rotation center (17) to the distance between spatial light modulator (18) and eyepiece lens (36) is variable to adjust demagnification.

24. A near-to-eye display device (10) as set forth in claim 22, characterized in that the device comprises an active optical spatial filter (41) between the eyepiece lens (36) and the spatial light modulator (18) to filter out undesired beams before they reach the exit pupil plane (27).

25. A near-to-eye display device (10) as set forth in claim 24, characterized in that the optical spatial filter (41) is a binary liquid crystal shutter where the open window thereof is steerable.

26. A near-to-eye display device (10) as set forth in claim 24, characterized in that the optical spatial filter (41) is placed on an intermediate image plane formed between the eyepiece lens (36) and the spatial light modulator (18).

27. A near-to-eye display device (10) as set forth in claim 24, characterized in that the optical spatial filter (41) is attached to or directly implemented on said eyepiece lens (36).

28. A near-to-eye display device (10) as set forth in claim 22, characterized in that a beam-splitter (44) is placed between the eyepiece lens (36) and eye (15).

29. A near-to-eye display device (10) as set forth in claim 1, characterized in that higher diffraction order replicas of the spatial light modulator (18) are separated by more than the eye pupil (19) size on the exit pupil plane (27) in the manner that said spatial light modulator image (21) have sufficiently small pixels wherein when it is placed at the eye rotation center (17), said higher diffraction order replicas are separated wide enough to be spatially filtered by the eye pupil (19).

30. A near-to-eye display device (10) as set forth in claim 1, characterized in that the viewing box (26) is larger than a minimum preconfigured size of the eye pupil (19) and the separation between higher diffraction order replicas on the eye pupil (19) plane are larger than the minimum preconfigured size of the eye pupil (19).

31. A near-to-eye display device (10) as set forth in claim 1, characterized in that a negative lens in the form of a demagnifier (42) is placed between the spatial light modulator (18) and the imaging lens (20) in the manner that the spatial light modulator (18) is first transformed by said demagnifier (42) into a transformed spatial light modulator (43) and said imaging lens (20) is configured to image said transformed spatial light modulator (43) at the eye rotation center (17).

32. A near-to-eye display device (10) as set forth in claim 31, characterized in that said imaging lens (20) is replaced by a curved reflector (12) in the form of an elliptical mirror and the demagnifier (42) is implemented by a convex mirror such that the transformed spatial light modulator (43) forms at the back of the demagnifier (42).

33. A near-to-eye display device (10) as in claim 32, characterized in that said imaging lens (20) is a curved reflector (12), a paraboloid mirror, or a planar diffractive off-axis Fresnel lens in an off-axis configuration of the near-to-eye display device (10).

34. A near-to-eye display device (10) as set forth in claim 33, characterized in that said spatial light modulator (18) is reflective or transmissive.

35. A near-to-eye display device (10) as set forth in claim 1, characterized in that said spatial light modulator (18) data is computed to create virtual scene in real-time as it is displayed.

36. A near-to-eye display device (10) as set forth in claim 35, characterized in that said real-time spatial light modulator (18) data is a function of head tracking data, pupil tracking data or environmental data.

37. A near-to-eye display device (10) as set forth in claim 1, characterized in that said near-to-eye display device (10) is a monochrome display device and light source (11) generates a coherent light wave of a single color.

38. A near-to-eye display device (10) as set forth in claim 1, characterized in that said near-to-eye display device (10) is a full color display device and light source (11) generates coherent light waves of different wavelengths in a time sequential manner.

39. A near-to-eye display device (10) as set forth in claim 1, characterized in that a positive lens in the form of a demagnifier (42) is placed between the spatial light modulator (18) and the imaging lens (20).

40. A near-to-eye display device (10) as set forth in claim 39, characterized in that the imaging lens (20) is replaced by a curved reflector (12) in the form of an elliptical mirror and the demagnifier (42) is implemented by a concave mirror such that the transformed spatial light modulator (43) forms at the back of the demagnifier (42).

41. A head-mountable display device comprising a near-to-eye display device (10) as set forth in claim 1.

* * * * *